(12) United States Patent
Polehn

(10) Patent No.: US 9,378,353 B2
(45) Date of Patent: Jun. 28, 2016

(54) METHODS AND SYSTEMS FOR DETERMINING A USER IDENTITY BY ANALYSIS OF REFLECTED RADIO FREQUENCY SIGNALS RECEIVED BY AN ANTENNA ARRAY

(71) Applicant: Verizon Patent and Licensing Inc., Arlington, VA (US)

(72) Inventor: Donna L. Polehn, Kirkland, WA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/454,661

(22) Filed: Aug. 7, 2014

(65) Prior Publication Data

US 2016/0042169 A1 Feb. 11, 2016

(51) Int. Cl.
*G06F 21/35* (2013.01)
*H04B 5/00* (2006.01)

(52) U.S. Cl.
CPC .............. *G06F 21/35* (2013.01); *H04B 5/0062* (2013.01)

(58) Field of Classification Search
CPC ....... G06F 21/35; H04B 5/0062; H04M 3/38; A61B 5/05; A61B 5/7221; A61B 5/6843; G08C 17/02; H01Q 15/0013; H04N 2005/4428
See application file for complete search history.

(56) References Cited

U.S. PATENT DOCUMENTS

| | | | | |
|---|---|---|---|---|
| 5,191,459 A * | 3/1993 | Thompson | ............ | H04B 10/504 348/E7.094 |
| 5,458,123 A * | 10/1995 | Unger | .................. | A61B 5/0006 128/903 |
| 6,023,619 A * | 2/2000 | Kaminsky | ............. | H04W 12/12 455/411 |
| 6,104,337 A * | 8/2000 | Coutts | ................ | A63B 71/0622 273/108.2 |
| 6,104,922 A * | 8/2000 | Baumann | ............ | H04B 7/18567 455/410 |
| 8,948,350 B2 * | 2/2015 | Hodge | ...................... | 379/114.14 |
| 2002/0039080 A1 * | 4/2002 | Wisherd | ..................... | G01S 5/02 342/463 |
| 2004/0075562 A1 * | 4/2004 | Land | ......................... | G01S 5/02 340/573.4 |
| 2004/0256452 A1 * | 12/2004 | Coughlin | ................ | G06F 21/35 235/380 |
| 2004/0257202 A1 * | 12/2004 | Coughlin | ................ | G06F 21/35 340/5.82 |
| 2006/0129839 A1 * | 6/2006 | Ye | ........................ | G06K 9/0002 713/186 |
| 2006/0208939 A1 * | 9/2006 | Nagai | .................... | H03J 1/0008 342/42 |
| 2009/0189740 A1 * | 7/2009 | Wiesner | ................. | G08C 17/02 340/10.3 |
| 2011/0109431 A1 * | 5/2011 | Bragagnini | ........ | G07C 9/00166 340/5.52 |
| 2013/0066400 A1 * | 3/2013 | Perryman | .......... | A61N 1/37229 607/59 |
| 2013/0127664 A1 * | 5/2013 | Garin | ...................... | G01S 19/24 342/357.63 |
| 2013/0181838 A1 * | 7/2013 | Luke | ....................... | G08B 21/24 340/572.1 |
| 2014/0092771 A1 * | 4/2014 | Siomina | ................ | H04W 24/08 370/252 |
| 2015/0350902 A1 * | 12/2015 | Baxley | .................... | H04W 4/22 726/7 |

OTHER PUBLICATIONS

Fadel Adib, Zachary Kabelac, Dina Katabi and Robert C. Miller "3D tracking via body radio reflections", Usenix, NSDI '14, Apr. 2-4, 2014, Seatlle, WA, 13 pages.*

* cited by examiner

*Primary Examiner* — Catherine Thiaw

(57) ABSTRACT

An exemplary method includes a user identification system associated with a computing device transmitting a radio frequency ("RF") signal from a transmitting antenna, receiving a plurality of reflected RF signals that are each a reflection of the transmitted RF signal from an external surface of a user, each of the plurality of reflected RF signals received at a separate one of a plurality of sensing antennas, determining an RF signature based on the plurality of reflected RF signals, and determining whether the RF signature matches a reference RF signature. Corresponding methods and systems are also described.

19 Claims, 17 Drawing Sheets

METHODS AND SYSTEMS FOR DETERMINING A USER IDENTITY BY ANALYSIS OF REFLECTED RADIO FREQUENCY SIGNALS RECEIVED BY AN ANTENNA ARRAY

BACKGROUND INFORMATION

Users and organizations often limit access to computing devices and networks for security purposes. With increasing usage of various computing devices, including mobile computing devices, there is an increased risk that the computing devices may end up in the hands of individuals who are not authorized to access the computing devices. Additionally, some computing devices, such as media content processing devices, allow users to establish different user profiles for personalizing the device content to specific end users or groups of users. Unfortunately, various techniques established to identify users and control access to computing devices and networks, such as password control, biometric scanning, and facial recognition systems, have been demonstrated to have vulnerabilities that allow individuals to gain unauthorized access to the computing devices and networks.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Methods and systems for determining a user identity by analysis of reflected radio frequency signals received by an antenna array are described herein. For example, as will be described in more detail below, a user identification system associated with a computing device (e.g., personal computer, laptop computer, smartphone device, tablet computer, etc.) may transmit a radio frequency ("RF") signal from a transmitting antenna. The user identification system may then receive a plurality of reflected RF signals that are each a reflection of the transmitted RF signal from an external surface (e.g., at least a portion of a user's facial region) separate from the computing device, each of the plurality of reflected RF signals received at a separate one of a plurality of sensing antennas. The user identification system may determine an RF signature based on the plurality of reflected RF signals. The user identification system may then determine whether the RF signature matches a reference RF signature (e.g., an RF signature associated with a user identifier, user profile, etc.) and, by so doing, determine an identity of a user associated with the RF signature.

Once the user identity has been determined, the user identification system may grant the user access to the computing device, to a network connected to the computing device, and/or to specified data, applications, and/or or services stored on and/or accessible by the computing device in accordance with one or more access privileges associated with the user. The user identity may also be utilized to identify a particular user profile associated with the user identity. For example, a user profile associated with a user identity may be utilized to personalize content (e.g., applications, media content, etc.) provided by the computing device to the user in accordance with a personal mode of operation.

The methods and systems described herein may provide convenient and secure access control for preventing unauthorized access to computing devices and networks. Moreover, the methods and systems described herein may be effectively utilized in portable computing devices, including handheld devices, without adding significantly to the cost and/or size of the portable computing devices. These and other benefits and/or advantages of the methods and systems described herein will be made apparent by the following detailed description.

Figure 1:
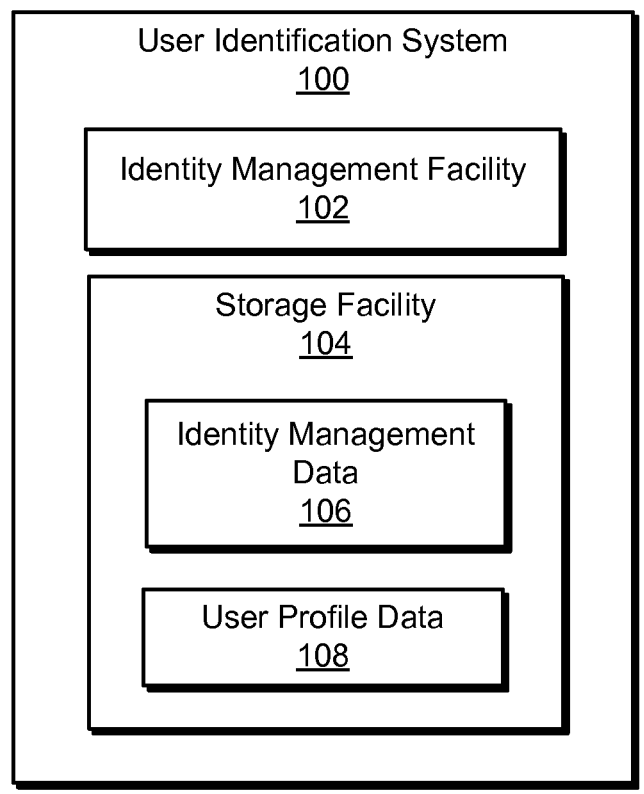
FIG. 1 illustrates an exemplary user identification system according to principles described herein.

FIG. 1 illustrates an exemplary user identification system 100 ("system 100") configured to determine a user identity by analysis of reflected RF signals received by a sensing antenna array. System 100 may be associated with (e.g., owned and/or managed by) a provider of an application executed by the computing device (e.g., a provider of an application that provides a media service by way of the computing device), an entity associated with the computing device (e.g., a manufacturer of the media content processing device), a network and/or service provider (e.g., a phone service provider), an entity associated with the computing system (e.g., a manufacturer of the computing device and/or a provider of an application executed by the computing device), and/or any other entity as may serve a particular implementation.

As shown, system 100 may include, without limitation, an identity management facility 102 and a storage facility 104 selectively and communicatively coupled to one another. It will be recognized that although facility 102 and facility 104 are shown to be separate facilities in FIG. 1, facilities 102 and 104 may be combined into fewer facilities, such as into a single facility, or divided into more facilities as may serve a particular implementation. Additionally or alternatively, one or more of facilities 102 and 104 may be omitted from and/or external to system 100 in other implementations. For example, storage facility 104 may be external of and communicatively coupled to system 100 in certain alternative implementations. Facilities 102 and 104 of system 100 may include or be otherwise implemented by one or more computing devices configured to perform one or more of the operations described herein. In such implementations, system 100 may be referred to as a computer-implemented system 100.

As shown, storage facility 104 may store identity management data 106 generated and/or used by identity management facility 102, and user profile data 108 representative of one or more user profiles of one or more users of system 100. Storage facility 104 may additionally or alternatively store any other type of data as may serve a particular implementation.

Data stored by storage facility 104 may be accessed by system 100 from any suitable source, including a source internal or external to system 100. Storage facility 104 may permanently or temporarily store data. In certain examples, system 100 may access data from a source external to system 100 and temporarily store the data in storage facility 104 for use by identity management facility 102.

Figure 2:
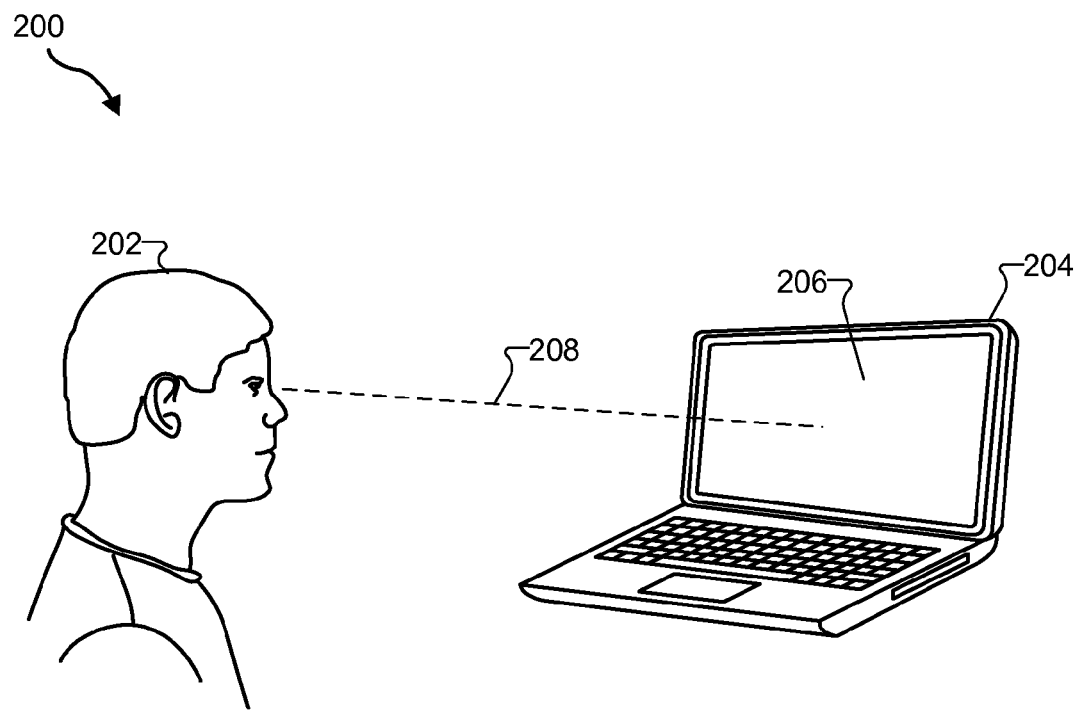
FIG. 2 shows an exemplary scenario in which a user is looking at a display screen associated with a computing device according to principles described herein.

Identity management facility 102 may perform an RF scan utilizing transmitted and reflected RF signals to determine an RF signature for a user attempting to access a computing device. To illustrate, FIG. 2 shows an exemplary scenario 200 in which a user 202 is looking at a computing device 204. For example, user 202 may be looking at a display screen 206 of computing device 204. Dotted line 208 represents a line of sight of user 202 while user 202 is looking at computing device 204. Computing device 204 may include transmitting and receiving antennas for determining an RF signature for user 202 while user 202 is looking at computing device 204, as will be described in more detail below.

Computing device 204 may include any computing device or combination of computing devices configured to be used by one or more individuals. For example, computing device 204 may include a computer (e.g., a laptop computer or personal computer ("PC")), a mobile device (e.g., a tablet computer or a smartphone device), a portable entertainment device (e.g., a portable gaming or video device), a television device, and/or any other computing device as may serve a particular implementation.

Display screen 206 may be implemented by any suitable display comprising a portion of computing device 204 and/or configured to be in communication with computing device 204. For example, display screen 206 may be implemented by a computer monitor screen, a laptop computer screen, a mobile device screen, a television screen, and/or any other type of display screen as may serve a particular implementation. While FIG. 2 shows computing device 204 and display screen 206 integrated into a single device, it will be recognized that in some examples, computing device 204 and display screen 206 may be separate devices.

The computing device 204 shown in FIG. 2 will now be described.

Figure 3:
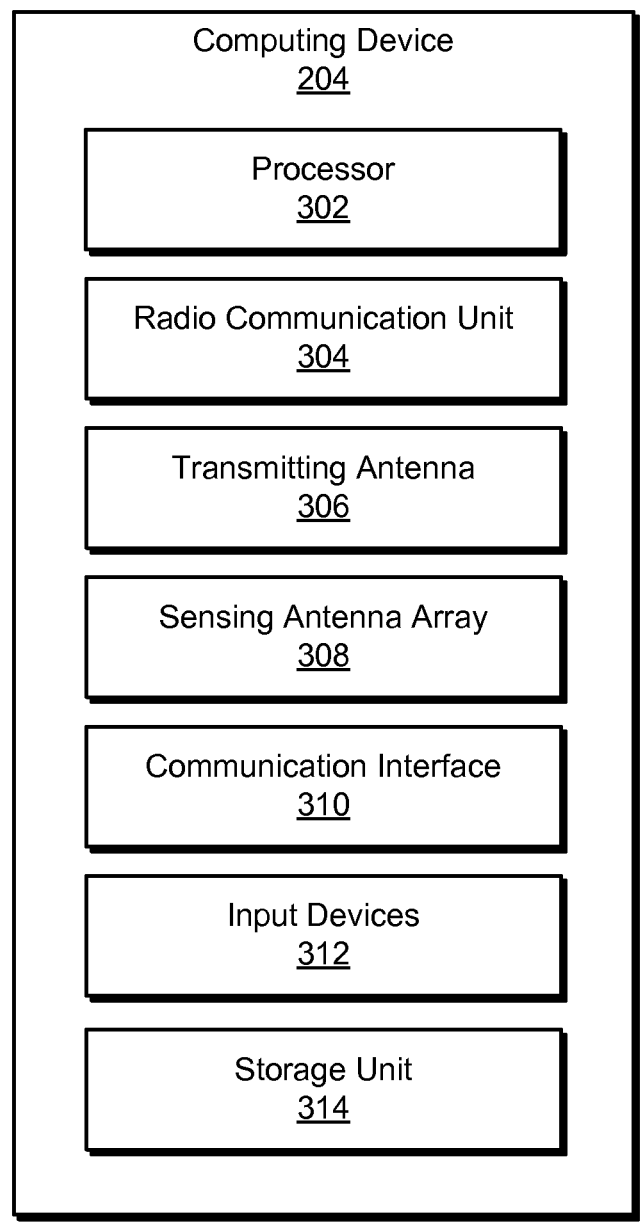
FIG. 3 illustrates exemplary components of a computing device according to principles described herein.

FIG. 3 illustrates exemplary components of computing device 204. As shown, computing device 204 may include a processor 302, a radio communication unit 304, a transmitting antenna 306, a sensing antenna array 308, a communication interface 310, input devices 312, and a storage unit 314. Computing device 204 may include additional or alternative components as may serve a particular implementation.

Processor 302 may include one or more processors configured to perform one or more of the operations described herein. For example, processor 302 may execute one or more applications (e.g., a user identification application) stored within storage unit 314, process input received by way of input devices 312, radio communication unit 304, and/or sensing antenna array 308, and/or direct radio communication unit 304 and/or transmitting antenna 306 to output transmission signals (e.g., RF signals).

Radio communication unit 304 may include any communication device or combination of devices that include capabilities for directing transmitting antenna 306 to transmit RF signals and/or that is capable of receiving RF signal input data from sensing antenna array 308. Radio communication unit 304 may, for example, include a software-defined radio that receives and sends signal data representative of transmitted and received RF signals.

Transmitting antenna 306 may include an antenna or combination of antennas capable of transmitting wireless signals (e.g., RF signals). Transmitting antenna 306 may, for example, include an RF antenna configured to transmit RF signals toward a target (e.g., user 202). Transmitting antenna 306 may include an antenna (e.g., a directional antenna, an omnidirectional antenna, etc.) configured to transmit RF signals in one or more directions.

Sensing antenna array 308 may include a plurality of sensing antennas arranged in a pattern and configured to receive wireless signals (e.g., RF signals). For example, sensing antennas of sensing antenna array 308 may each receive reflected RF signals that are each a reflection of a transmitted RF signal transmitted by transmitting antenna 306. The reflected RF signals received by sensing antenna array 308 may include, for example, signals reflected off a user's face (e.g., off a face of user 202).

Communication interface 310 may be configured to facilitate communication of computing device 204 with one or more other devices. Examples of communication interface 310 include, without limitation, a wired network interface (such as a network interface card), a wireless network interface (such as a wireless network interface card), a modem, an audio/video connection, and any other suitable interface.

Input devices 312 may include any device or combination of devices that facilitate input provided by a user. For example, input devices 312 may include a touchscreen configured to facilitate input by a user of one or more touchscreen gestures, one or more touchpads and/or mouse devices configured to facilitate input by a user of one or more touch pad gestures, one or more buttons configured to facilitate selection by a user of one or more options, a microphone configured to facilitate input of one or more voice commands spoken by a user, a keyboard configured to facilitate text input, one or more cameras and/or other sensors that track user movement, and/or any other type of input device as may serve a particular implementation.

Storage unit 314 may store any type of data as may serve a particular implementation. For example, storage unit 314 may store data representative of one or more applications (e.g., a user identification application) that may be executed by computing device 204. Exemplary interrelationships between the various components of computing device 204 shown in FIG. 3 will now be described.

Figure 4:
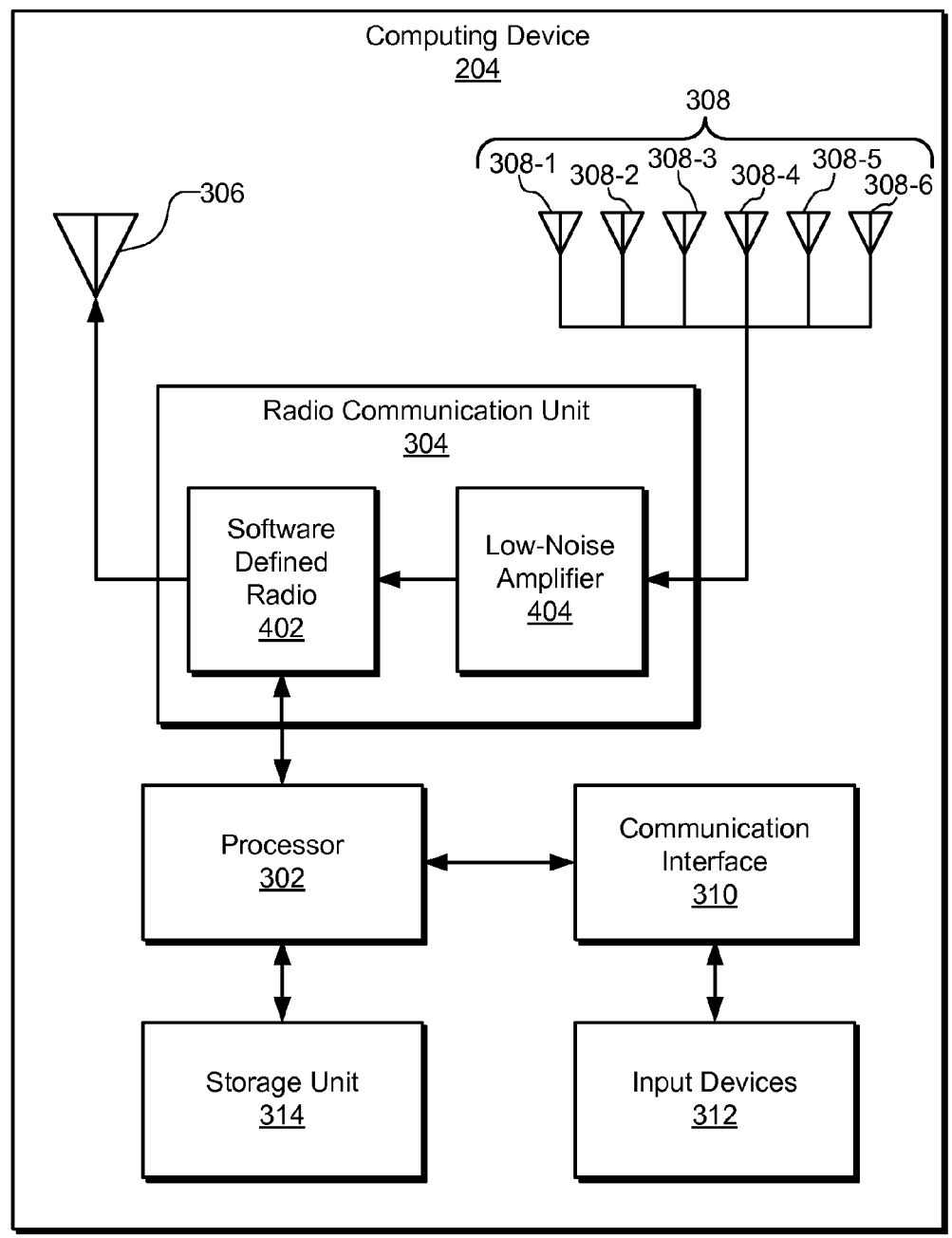
FIG. 4 illustrates exemplary components of a computing device and their interrelationships according to principles described herein.

FIG. 4 illustrates exemplary components of computing device 204. As shown, radio communication unit 304 of computing device 204 may include a software-defined radio ("SDR") 402 and a low-noise amplifier 404. Radio communication unit 304 may include additional or alternative components as may serve a particular implementation.

SDR 402 may be configured to interface between digital components (e.g., processor 302) and analog signal components (e.g., transmitting antenna 306 and sensing antenna array 308) of computing device 204. SDR 402 may include a sound card, analog-to-digital converter, and/or digital-to-analog converter to convert between analog RF signals and digital signal data that may be processed by processor 302. For example, SDR 402 may convert digital signals received from processor 302 to analog RF signals that are sent to transmitting antenna 306 for transmission. Additionally, analog RF signals received by sensing antenna array 308 may be converted by SDR 402 to digital signals to be processed by processor 302. While FIG. 4 shows that radio communication unit 304 includes SDR 402 and low-noise amplifier 404, it will be recognized that in some examples, radio communication unit 304 may include one or more components in addition to and/or in place of SDR 402 that are implemented in hardware (e.g., mixers, filters, amplifiers, modulators/demodulators, and/or detectors) rather than in SDR 402.

As shown, low-noise amplifier 404 may be located between antenna array 308 and SDR 402. Low-noise amplifier 404 may electrically amplify RF signals received by sensing antenna array 308 and transmit the amplified RF signals to SDR 402. Accordingly, weak RF signals received by sensing antenna array 308 may be sufficiently amplified prior to converting the received RF signals to digital signal data.

As shown in FIG. 4, sensing antenna array 308 may include a plurality of sensing antennas 308-1 through 308-6. Although six sensing antennas 308-1 through 308-6 are shown for purposes of illustration, sensing antenna array 308 may include any suitable number and arrangement of sensing antennas as may serve a particular implementation. Additionally, in some implementations, computing device 204 may include a plurality of separate sensing antenna arrays 308, each comprising one or more sensing antennas. Sensing antennas 308-1 through 308-6 may each be arranged in substantially the same plane, such as a plane parallel to a display surface of display screen 206. As illustrated, sensing antennas 308-1 through 308-6 may be electrically combined into a single wiring line connected to low-noise amplifier 404 such that the RF signals received by each of sensing antennas 308-1 through 308-6 are combined electrically into a single RF signal that is transmitted to low-noise amplifier 404.

As will be discussed in greater detail below, a wavelength pattern corresponding to the combined RF signal may be referred to herein as an "RF signature." In additional implementations, an "RF signature" may refer to a 3-dimensional surface map corresponding to an individual. The RF signature does not represent a wavelength of an RF signal received by only one of sensing antennas 308-1 through 308-6; rather, the RF signature represents a combined RF signal waveform obtained based on the combined signal corresponding to the multiple RF signals received by sensing antennas 308-1 through 308-6. It will be recognized that although sensing antennas 308-1 through 308-6 are shown to be connected to a common line that electrically combines individual RF signals from each of sensing antennas 308-1 through 308-6 into a single combined signal that is transmitted to low-noise amplifier 404, in some examples, individual RF signals from sensing antennas 308-1 through 308-6 may be separately amplified (e.g., using multiple low-noise amplifiers) and either electrically combined following the signal amplification or transmitted to SDR 402 without being electrically combined (e.g., the RF signals may be converted to digital signals and combined by SDR 402). A combined signal received from sensing antennas 308-1 through 308-6 may be amplified by low-noise amplifier 404 and then converted from an analog signal to a digital signal by SDR 402. Processor 302 may analyze the RF signature corresponding to the combined signal to determine a user identity. For example, the RF signature may be uniquely correlated to a particular user.

Figure 5:
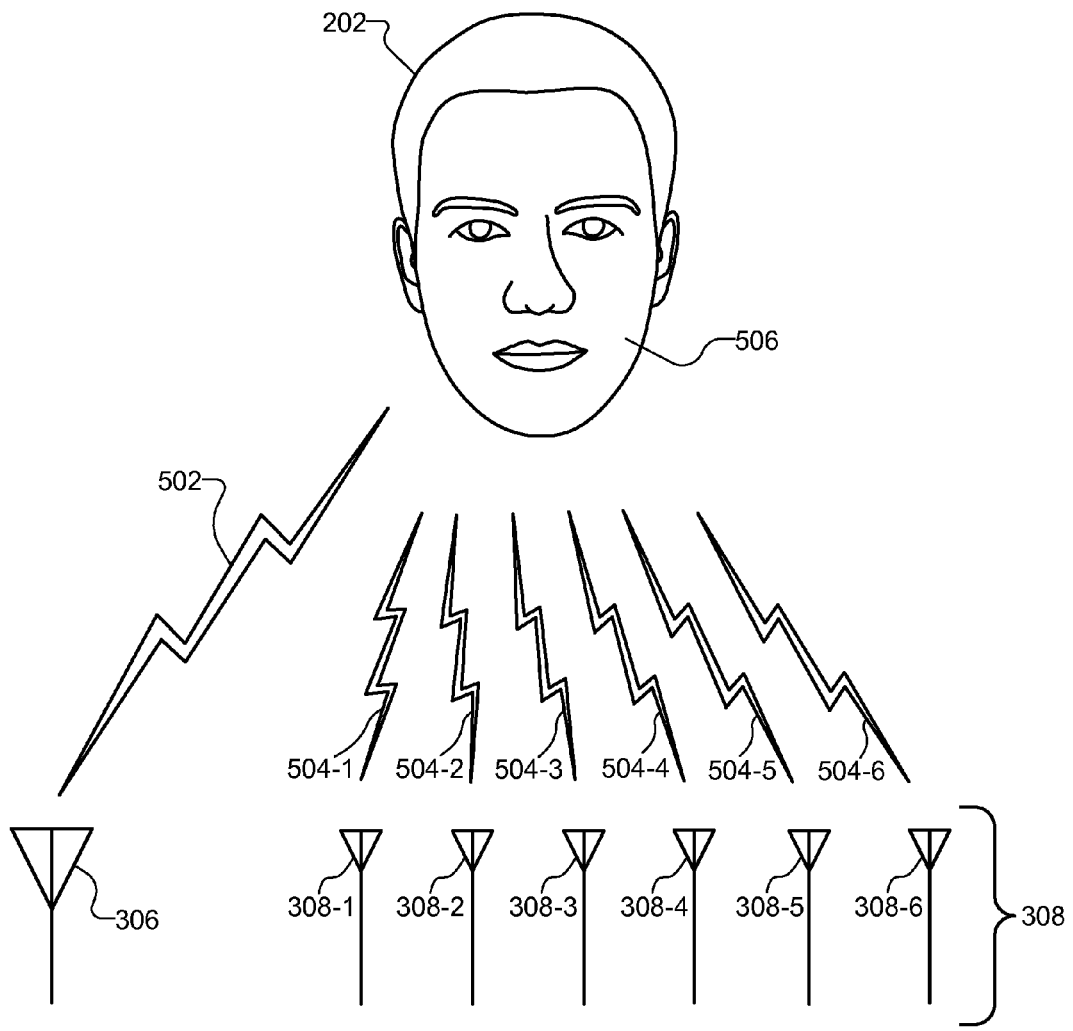
FIG. 5 illustrates an exemplary scenario in which a radio frequency ("RF") signal is transmitted toward a user and reflected RF signals reflected from the user are received at each of a plurality of sensing antennas of a sensing antenna array.

To illustrate, FIG. 5 shows an exemplary scenario 500 in which an RF signal 502 is transmitted toward a user 202, and reflected RF signals 504-1 through 504-6, which are reflected from a bodily profile of user 202, are received at each of a plurality of sensing antennas 308-1 through 308-6 of sensing antenna array 308. For example, transmitted RF signal 502 may be reflected from an external surface, such as a facial region 506 of the bodily profile of user 202, to form reflected RF signals 504-1 through 504-6.

Transmitted RF signal 502 may have an amplitude, phase, and frequency that is defined by SDR 402 and/or processor 302. For example, SDR 402 of radio communication unit 304 may generate an RF signal that has a specified amplitude (i.e., magnitude), phase, and frequency and that is transmitted by transmitting antenna 306. When transmitted RF signal 502 is reflected from facial region 506 of user 202, the RF signal may be reflected in various directions based on the portions of facial region 506 upon which transmitted RF signal 502 is incident. Each reflected RF signal 504-1 through 504-6 may be reflected toward a different sensing antenna 308-1 through 308-6 based, at least in part, on the portion of facial region 506 that the reflected RF signal 504-1 through 504-6 was reflected from. Accordingly, sensing antenna 308-1 through 308-6 may each receive a different one of reflected RF signals 504-1 through 504-6. Two or more of reflected RF signals 504-1 through 504-6 may differ from each other and/or from transmitted RF signal 502 in phase and/or amplitude.

The phase and/or amplitude of each reflected RF signal 504-1 through 504-6 may be based, at least in part, on the portion of facial region 506 that the reflected RF signal 504-1 through 504-6 was reflected from. Additionally, the phase and/or amplitude of reflected RF signals 504-1 through 504-6 received by sensing antennas 308-1 through 308-6 may be based in part on the distance between facial region 506 of user 202 and sensing antennas 308-1 through 308-6. Accordingly, user 202 may be instructed to position computing device 202 at a specified distance from his or her face while RF signal 502 is being transmitted. In additional implementations, computing device 202 may include capabilities for measuring a distance between facial region 506 and sensing antennas 308-1 through 308-6 such that computing device 202 may compensate for any differences in measurements due to the position of facial region 506 with respect to sensing antennas 308-1 through 308-6.

Figure 6:
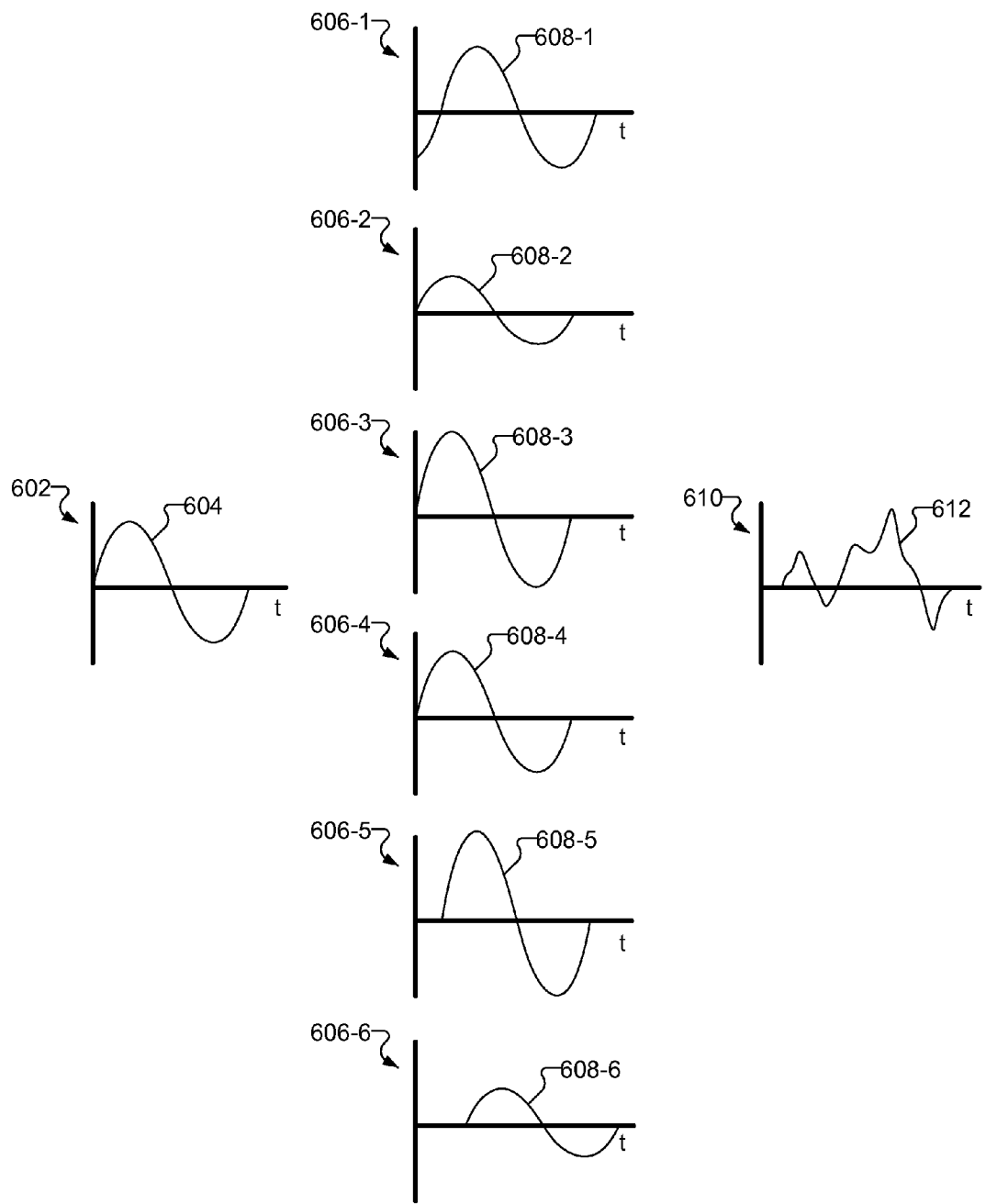
FIG. 6 illustrates exemplary graphs of transmitted RF signal waveforms, reflected RF signal waveforms, and a combined RF signal waveform based on the reflected RF signal waveforms.

FIG. 6 illustrates various waveforms corresponding to RF signals shown in FIG. 5. For example, a waveform graph 602 includes a waveform 604 corresponding to transmitted RF signal 502, and waveform graphs 606-1 through 606-6 include waveforms 608-1 through 608-6 corresponding to reflected RF signals 504-1 through 504-6. Additionally, FIG. 6 illustrates a waveform graph 610 of an RF signature that is represented as a combined waveform 612 obtained by combining waveforms 606-1 through 606-6 of reflected RF signals 504-1 through 504-6. Each of graphs 602, 606-1 through 606-6, and 610 show the corresponding waveforms and RF signature plotted along a time (t) axis, with the amplitudes of the waveforms being represented by a distance of the waveforms and RF signature from the time axis in a direction perpendicular to the time axis.

As shown, waveform 604 corresponding to transmitted RF signal 502 may have an amplitude and/or phase that is specified by processor 302 and/or SDR 402. For example, SDR 402 of radio communication unit 304 may be directed by processor 302 to output a transmitted RF signal 502 having waveform 604. As transmitted RF signal 502 impinges on various portions of facial region 506 of user 202, the transmitted RF signal 502 is reflected in various directions as RF signals 504-1 through 504-6. As shown in graphs 606-1 through 606-6, waveforms 608-1 through 608-6 corresponding to reflected RF signals 504-1 through 504-6 may be different in amplitude and/or phase in comparison with waveform 604 of transmitted RF signal 502. For example, as illustrated, waveforms 608-1, 608-5, and 608-6 are shifted (i.e., offset) in phase in comparison with the phase of waveform 604. Waveforms 608-1, 608-5, and 608-6 have phases that are delayed in comparison with the phase of waveform 604. Additionally, as illustrated in FIG. 6, waveforms 608-2, 608-3, 608-5, and 608-6 have amplitudes that differ from the amplitude of waveform 604. For example, waveforms 608-3 and 608-5 have amplitudes that are greater than the amplitude of waveform 604. Further, waveforms 608-2 and 608-6 have amplitudes that are less than the amplitude of waveform 604. Waveforms 608-1 through 608-6 may each be determined based on a single measurement. Alternatively, waveforms 608-1 through 608-6 may be determined based on multiple measurements obtained, for example, over a specified time period or at separate time intervals. For example, multiple measurements of waveforms received by each of sensing antennas 308-1 through 308-6 may be separately combined (e.g., by summation and/or averaging) to produce waveforms 608-1 through 608-6.

Waveforms 608-1 through 608-6 corresponding to reflected RF signals 504-1 through 504-6 may be unique to user 202 in comparison with other users having different facial characteristics. For example, the transmitted RF signal 502 having the waveform 604 would be reflected differently from a facial region of another user, thereby resulting in one or more reflected RF signals, such as reflected RF signals that are received by sensing antennas 308-1 through 308-6, having different amplitudes and/or phases in comparison with waveforms 608-1 through 608-6 corresponding to user 202. The differences in waveforms 608-1 through 608-6 in comparison with waveform 604 may be due, at least in part, to the unique facial characteristics of user 202. For example, the unique geometry of facial region 506 of user 202 may cause transmitted RF signal 502 to be reflected uniquely as reflected RF signals 504-1 through 504-6 towards sensing antennas 308-1 through 308-6. The reflected RF signals 504-1 through 504-6 may likewise have unique waveforms 608-1 through 608-6 specific to facial regions 506 of user 202.

Additionally, the differences in waveforms 608-1 through 608-6 in comparison with waveform 604 may be due, at least in part, to the locations of sensing antennas 308-1 through 308-6 relative to user 202. For example, the locations and/or orientations of sensing antennas 308-1 through 308-6 in computing device 204 may affect which reflected RF signals are received from facial region 506 of user 202. Accordingly, computing devices having different sensing antenna array geometries may receive different combinations of reflected RF signals from a user.

According to some embodiments, waveforms 608-1 through 608-6 corresponding to reflected RF signals 504-1 through 504-6 may be individually received by SDR 402 and correlated to user 202. For example, each of individual waveforms 608-1 through 608-6 may be aggregately correlated to user 202 and stored as an RF signature for user 202. Because one or more of the waveforms of reflected RF signals reflected from another user having different facial characteristics and received by sensing antennas 308-1 through 308-6 would differ from waveforms 608-1 of 608-6 correlated to user 202, processor 302 would be capable of distinguishing between user 202 and another user based on a comparison of reflected RF signals received by sensing antennas 308-1 through 308-6. For example, waveforms of one or more RF signals reflected from a facial region of another user and received by one or more of sensing antennas 308-1 through 308-6 would each differ in at least one of phase and amplitude in comparison with waveforms 608-1 through 608-6.

In additional implementations, waveforms 608-1 through 608-6 may be combined electrically prior to being received by SDR 402. For example, returning to FIG. 4, sensing antennas 308-1 through 308-6 may be connected to a single line that inputs combined signal data to low-noise amplifier 404. Low-noise amplifier 404 may then amplify the combined signal prior to sending the combined signal to SDR 402. Alternatively, the reflected RF signals may be electrically and/or digitally combined at any other suitable point between sensing antenna array 308 and SDR 402 (e.g., a location between low-noise amplifier 404 and SDR 402), without limitation. Alternatively, the reflected RF signals received by sensing antennas 308-1 through 308-6 may be separately amplified and transmitted to SDR 402. Subsequently, SDR 402, processor 302, and/or any other suitable component of computing device 204, and/or a computing device external to computing device 204, may convert each of the reflected and amplified RF signals into digital signal data, which may then be digitally combined by SDR 402 and/or processor 302.

Graph 610 shown in FIG. 6 corresponds to a combined RF signal that is produced by electrically and/or digitally combining reflected RF signals 504-1 through 504-6. Graph 610 includes a unique combined waveform, or RF signature, specific to user 202. For example, reflected RF signals 504-1 through 504-6 received by sensing antennas 308-1 through 308-6 may be combined into a single electrical signal (e.g., an analog signal) prior to amplification by low-noise amplifier 404 and/or prior to being transmitted to SDR 402. Alternatively, as mentioned above, reflected RF signals 504-1 through 504-6 received by each of sensing antennas 308-1 through 308-6 may alternatively be combined at any other suitable location in computing device 204 and/or external to computing device 204. When reflected RF signals 504-1 through 504-6 received by sensing antennas 308-1 through 308-6 are combined after being converted to digital signal information, the digital signal information corresponding to each of sensing antennas 308-1 through 308-6 may be digitally combined using any suitable heuristic. For example, the digital signal information corresponding to each of sensing antennas 308-1 through 308-6 may be combined using a Fourier transform summation to calculate an RF signature for user 202, such as that represented by combined waveform 612.

In order to identify a user of computing device 204, a reference RF signature associated with the user may be determined and stored. For example, a reference RF signature for a user may be stored in storage unit 314 of computing device 204 or in a storage location external to computing device 204 (e.g., an identity management server). A reference RF signature for user 202 may, for example, include data representing each of waveforms 608-1 through 608-6 corresponding to reflected RF signals 504-1 through 504-6 and/or data representing combined waveform 612 obtained by electrically combining waveforms 608-1 through 608-6 and/or digitally combining data representing waveforms 608-1 through 608-6. The reference RF signature for user 202 may be measured by transmitting RF signal 502 toward facial region 506 of user 202 and determining waveforms 608-1 through 608-6 corresponding to reflected RF signals 504-1 through 504-6 received by sensing antennas 308-1 through 308-6, and/or determining a combined waveform 612, at one or more points in time. When waveforms 608-1 through 608-6 and/or waveform 612 are measured at a plurality of points in time, the multiple measurements for each waveform may be averaged and/or otherwise combined to produce the reference RF signature.

The reference RF signature for user 202 may be generated by computing device 204. Alternatively, the reference RF signature for user 202 may be generated and/or stored by another computing device and transferred to computing device 204. For example, computing device 204 may be connected to another computing device and/or server via a network, as will be described more below. If the reference RF signature received by computing device 204 from an external location was generated by another computing device having an array of sensing antennas differing in array geometry and/or number of sensing antennas, or based on a transmitted RF signal having a wavelength with a different amplitude, phase, and/or frequency then wavelength 604, a new reference RF signature for user 202 may be generated by computing device 204. Alternatively, the reference RF signature may be modified by computing device 204 so as to correspond to sensing antenna array 308 and/or transmitted RF signal 502 of computing device 202.

An RF signature may be obtained by performing an RF scan of a user (e.g., a scan of a facial region of the user) when the user seeks to access at least a portion of computing device 204. For example, when a user turns computing device 204 on and/or seeks to logon to an operating system of computing device 204 or otherwise access data stored on computing device 204, computing device 204 may perform an RF scan to obtain an RF signature of the user. For example, prior to allowing the user to logon to computing device 204, computing device 204 may require that an RF signature of the user be obtained for comparison with one or more previously stored reference RF signatures. Computing device 204 may notify the user, via, for example, a message on screen 206, that an RF signature must be obtained through an RF scan before allowing the user access to the operating system of computing device 204. The message may include a prompt for the user to initiate an RF scan to measure the RF signature. The user may be given an opportunity to position computing device 204 relative to, for example, his or her facial region prior to initiating the RF scan. When the user is ready, he or she may initiate the RF scan through interaction with one or more of input devices 312. Alternatively, computing device 204 may provide, for example, a time window during which the user may prepare for the RF scan. Upon elapse of the time window, computing device 204 may automatically initiate the RF scan. During the RF scan, SDR 402 may cause transmitting antenna 306 to transmit RF signal 502 toward the user, and reflected RF signals 504-1 through 504-6 may be received by sensing antennas 308-1 through 308-6. The RF signature of the user may be determined according to any of the methods described above.

The determined RF signature of the user may then be compared with one or more reference RF signatures stored in storage unit 314 and/or stored at a location external to computing device 204. Processor 302 of computing device 204 may determine, for example, whether the RF signature of the user matches one of the stored reference RF signatures to at least a threshold degree of certainty. Various criteria may be defined within processor 302 for determining whether an RF signature matches a reference RF signature. In some embodiments, computing device 204 may allow for the threshold to be selected by an authorized user. For example, where added security is desired, a higher degree of certainty may be required in order to meet the selected threshold for determining that an RF signature matches a reference RF signature.

In additional implementations, computing device 204 may determine whether an RF signature of a user matches a reference RF signature for purposes of allowing the user to access selected portions of data on computing device 204. For example, a user may be permitted to access some portions of data on computing device 204 while being excluded from accessing other portions of data without first determining whether an RF signature corresponding to the user matches a reference RF signature. For example, the user may only access certain applications and/or profiles on computing device 204 without first determining that the user has an RF signature matching a reference RF signature corresponding to a user permitted to access such applications and/or profiles. In some examples, a plurality of reference RF signatures may be stored on computing device 204, with each of the plurality of reference RF signatures being associated with a different user having a different profile. The different profiles may have different access privileges defining which applications, data, and/or write privileges are available to a user associated with the profile. Alternatively, the different profiles may specify how content is organized and presented to different users associated with the profiles in accordance with personal modes of operation specific to each of the different users.

If an RF signature of the user does not match a stored reference RF signature to at least the threshold degree of certainty, computing device 204 may perform additional RF scans, particularly if the initial RF signature is close to, but not within, the threshold degree of certainty. If, after the initial and/or subsequent RF scans, the RF signature of the user is determined to not match a stored reference RF signature, the RF signature may be associated with a new user identifier. An authorized individual, such as an administrator, may determine a level of access and/or a may establish a new profile for a user associated with the new user identifier upon determining who the user is. In some implementations, the user may be prevented from accessing data on computing device 204. Alternatively, the user may be prevented from accessing certain portions of data (e.g., certain applications) stored on computing device 204, and/or the user may be logged into computing device 204 under a general profile that is not associated with a known user. Additionally, computing device 204 may initiate a security action in response to a determination that the RF signature of the user does not match a stored reference RF signature. For example, computing device 204 may notify an administrator or other user associated with a reference RF signature of a failed attempt to access computing device 204 and/or computing device 204 may prevent further access attempts prior to being unlocked by an administrator.

Computing device 204 may be connected to one or more external devices via a network, as will now be described.

Figure 7:
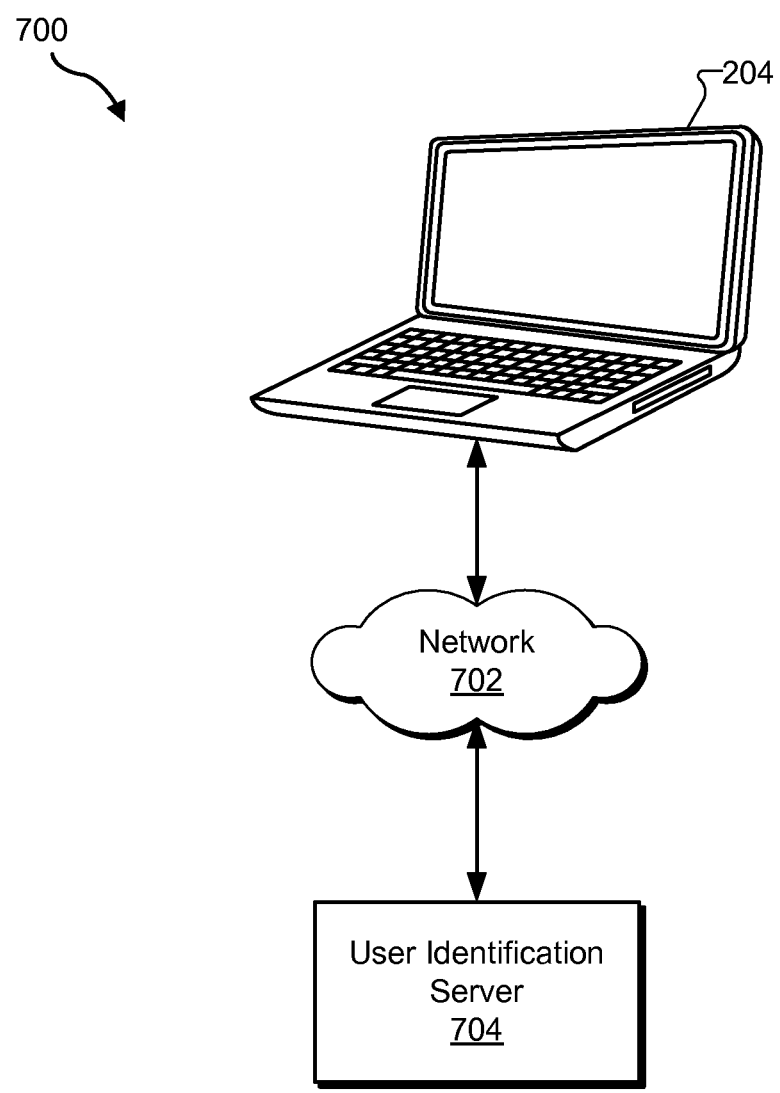
FIG. 7 illustrates an exemplary scenario in which a computing device and a user identification server are each connected to a network according to principles described herein.

FIG. 7 illustrates an exemplary environment 700 in which computing device 204 is associated with a network 702. Network 702 may include one or more networks that carry signals between computing devices, such as one or more telecommunication networks (e.g., time-division multiplexing ("TDM") networks), wireless networks (e.g., Wi-Fi networks), wireless communication networks, mobile telephone networks (e.g., cellular telephone networks), closed media networks, open media networks, wide area networks (e.g., the Internet), local area networks, and/or any other networks capable of carrying data representative of telephone calls. Computing device 204 may be connected to network 702 in any suitable manner. For example, computing device 204 may be implemented by one or more components residing within network 702. Additionally or alternatively, computing device 204 may be external to network 702 and communicate with elements within network 702 by way of one or more network connections.

As shown, computing device 204 may be connected to a user identification server 704 by network 702. User identification data, such as reference RF signature data, may be stored on computing device 204. Additionally or alternatively, user identification data may be stored on user identification server 704. For example, one or more reference RF signatures determined by computing device 204 and/or by one or more other computing devices may be stored on user identification server 704. Reference RF signatures stored on user identification server 704 may be accessed by computing device 204. Additionally, other computing devices may access reference RF signatures from user identification server 704. For example, a user may have access to one or more other computing devices in addition to computing device 204. Rather than obtaining a separate reference RF signature for each of the different computing devices, the user may determine a reference RF signature on one device and store the reference RF signature on user identification server 704 for utilization on the other computing devices.

In addition to storing reference RF signature data, user identification server 704 may store other data for access by computing device 204 and/or other computing devices connected to network 702. For example, user identification server 704 may store data identifying user access privileges, user profile data, and/or any other suitable data for use by computing device 204 and/or any other computing devices connected to network 702. Accordingly, data may be remotely accessed from identification server 704 by computing device 204, and/or by any other authorized computing device connected to user identification server 704 via network 702, without limitation. In some implementations, user identification server 704 may include capabilities for calculating an RF signature for a user based on measurements obtained by computing device 204 and/or another computing device connected to network 702. User identification server 704 may additionally include capabilities for determining whether a measured RF signature matches a reference RF signature.

Figure 8:
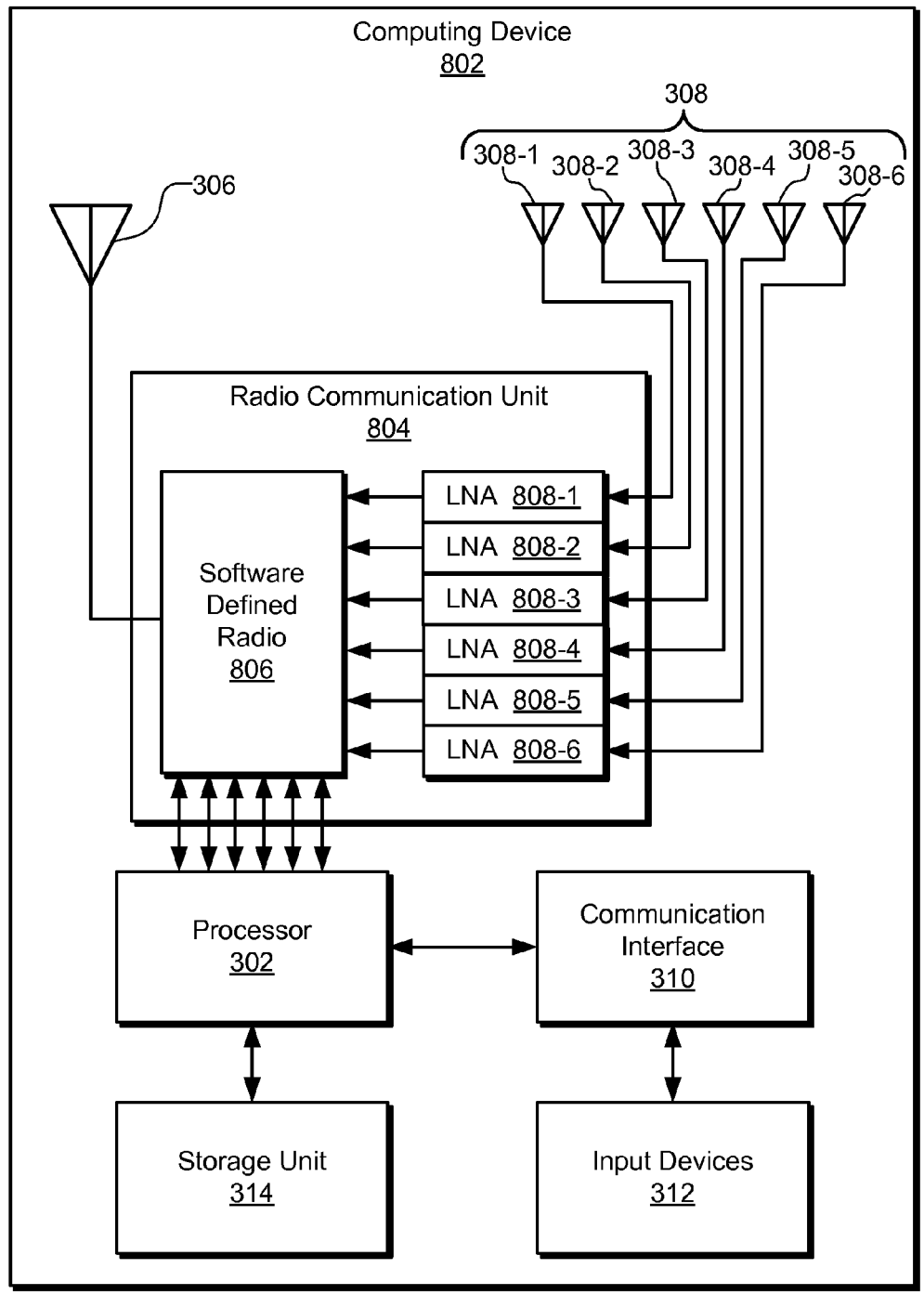
FIG. 8 illustrates exemplary components of a computing device and their interrelationships according to principles described herein.

It will be recognized that a computing device may be configured such that individual RF signals received by each of a plurality of sensing antennas may be separately transferred to a radio communication unit of the computing device without being electrically combined. To illustrate, FIG. 8 shows another exemplary computing device 802. Computing device 802 includes a radio communication unit 804 having an SDR 806 and a plurality of low-noise amplifiers 808-1 through 808-6. As shown, each of sensing antennas 308-1 through 308-6 in sensing antenna array 308 is separately connected to radio communication unit 804 via a separate line instead of being collectively connected to radio communication unit 804 via a single line.

As shown, each of sensing antennas 308-1 through 308-6 is connected to a separate one of low-noise amplifiers 808-1 through 808-6. Accordingly, each of the reflected RF signals received by sensing antennas 308-1 through 308-6 is separately amplified by a corresponding one of low-noise amplifiers 808-1 through 808-6. Each of low-noise amplifiers 808-1 through 808-6 then sends a separate amplified RF signal to SDR 806. SDR 806 may convert the signals received from each of low-noise amplifiers 808-1 through 808-6 from analog signals to digital signal data. The digital signal data corresponding to each of sensing antennas 308-1 through 308-6 may then be transferred to processor 302. Accordingly, each of the reflected RF signals received by sensing antennas 308-1 through 308-6 may be individually received by SDR 806 and stored in storage unit 314. The reflected RF signals may then be further processed individually by processor 302.

The computing device 802 illustrated in FIG. 8 may be used to determine an RF signature for a user. For example, SDR 806, processor 302, and/or any other suitable component of computing device 802, and/or a computing device external to computing device 802, may digitally combine each of the reflected RF signals. For example, digital signal information corresponding to each of sensing antennas 308-1 through 308-6 may be combined using any suitable heuristic. Digital information corresponding to each of sensing antennas 308-1 through 308-6 may be combined, for example, using a Fourier transform summation to calculate an RF signature for a user. An RF signature determined in such a manner may approximate, for example, the combined waveform 612 illustrated in FIG. 6.

In some implementations, computing device 802 may be utilized to determine an RF signature that includes a surface map corresponding to a user. For example, digital signal information corresponding to each of sensing antennas 308-1 through 308-6 may be processed to render a 3-dimensional surface map of the user's facial region. A 3-dimensional surface map corresponding to the user, such as a surface map of the user's facial region, may be determined from the digital signal information based on calculations that take into account the number of sensing antennas 308-1 through 308-6 in sensing antenna array 308, the physical locations of sensing antennas 308-1 through 308-6, the location of the user's facial region with respect to sensing antenna array 308, reflection characteristics of the user's facial region, waveform characteristics of an RF signal transmitted by transmitting antenna 306, and/or waveform characteristics of RF signals reflected from the user's facial region.

The rendered 3-dimensional surface map of the user may comprise sufficient detail to compare the 3-dimensional surface map, and/or data representing the 3-dimensional surface map, with other 3-dimensional surface map renderings and/or data. In addition to generating a rendered 3-dimensional surface map of a user for comparison with one or more reference surface maps stored in storage unit 314 and/or at a location external to computing device 802, computing device 802 may be utilized to generate reference 3-dimensional surface maps corresponding to various users. In some implementations, computing device 802 may receive data for a reference 3-dimensional surface map of a user from a location external to computing device 802, such as, for example, user identification server 704 illustrated in FIG. 7.

Because reflected RF signals received by each of sensing antennas 308-1 through 308-6 in sensing antenna array 308 are used to generate a 3-dimensional surface map, which may then be compared with a reference 3-dimensional surface map, any differences in data used to generate the generated 3-dimensional surface map and the reference 3-dimensional surface map may not be factored in to the comparison. Accordingly, 3-dimensional surface maps obtained from devices having, for example, different receiving antenna array geometries, different numbers of sensing antennas, different transmitting antenna and/or sensing antenna locations, and/or different transmitted RF and/or received RF waveforms, may be compared.

3-dimensional surface maps may be generated on computing device 802 by, for example, processor 302. Alternatively, 3-dimensional surface maps may be generated at a location external to computing device 802. In some implementations, computing device 802 may have insufficient processing capabilities to produce a 3-dimensional surface map based on reflected RF signals received by antenna array 308. Accordingly, rendering of a 3-dimensional surface map may be conducted at one or more locations external to computing device 802, as will now be described.

Figure 9:
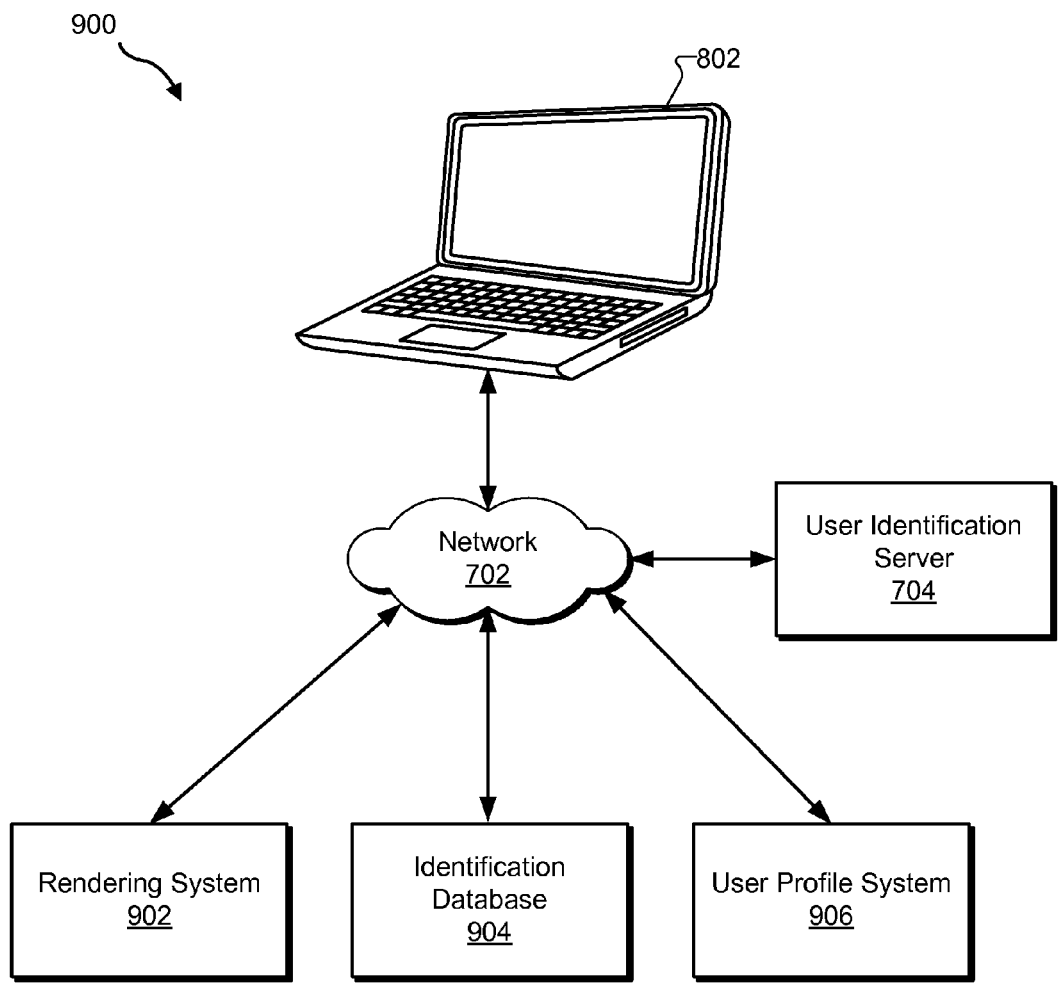
FIG. 9 illustrates an exemplary scenario in which a computing device, a user identification server, a rendering system, an identification database, and a user profile system are each connected to a network according to principles described herein.

FIG. 9 illustrates an exemplary environment 900 in which computing device 802 is associated with network 702. As shown, computing device 802 may be connected to user identification server 704, a rendering system 902, an identification database 904, and a user profile system 906 by way of network 702. In some implementations, one or more of user identification server 704, rendering system 902, identification database 904, and user profile system 906 may be part of one or more discrete cloud-based network environments.

Rendering system 902 may include a program for calculating an RF signature, such as a 3-dimensional surface map for a user, based on measurements obtained by computing device 802 and/or another computing device connected to network 702. For example, rendering system 902 may include a rendering engine that converts digital signal information corresponding to RF signals received by sensing antennas of a sensing antenna array, such as sensing antenna array 308 of computing device 802, to a 3-dimensional surface map corresponding to a user.

Identification database 904 may store data for access by computing device 802, user identification server 704, and/or other computing devices connected to network 702. User identification data, such as reference RF signature data, may be stored on computing device 802. Additionally or alternatively, user identification data may be stored on identification database 904. For example, one or more reference RF signatures determined by computing device 802 and/or by one or more other computing devices may be stored on identification database 904. Reference RF signatures stored on user identification database 904 may be accessed by computing device 802. Additionally, other computing devices may access reference RF signatures from identification database 904. For example, a user may have access to one or more other computing devices in addition to computing device 802. Rather than obtaining a separate reference RF signature for each of the different computing devices, the user may determine a reference RF signature on one device and store the reference RF signature on identification database 904 for utilization on the other computing devices. User identification server 704 may additionally include capabilities for determining whether a measured RF signature matches a reference RF signature.

User profile system 906 may store user profiles for managing profiles associates with various users associated with user identification server 704. User profile system 906 may include data indicating device access privileges for users, such as device access lists defining one or more devices that each user is associated with and/or which devices each user is permitted to access. For example, a user of computing device 802 may own or otherwise have access to one or more devices in addition to computing device 802. A device access list stored in user profile system 906 may further indicate which devices have RF signal scanning capabilities enabling comparison of an RF signature with stored reference RF signatures. Accordingly, a single reference RF signature for the user may be used to grant, limit, or deny access to one or more devices listed in user profile system in association with the user. User profile data stored in user profile system 906 may also indicate preferences, such as formatting and content management preferences, for the user in association with each of the devices associated with the user.

RF signatures, including combined RF signal waveform data and/or 3-dimensional surface maps, may additionally be utilized to identify users for a variety of authentication and/or security purposes according to any of the ways described herein. Use of RF signatures for identification and/or authentication may be used in addition to or in place of other identification and/or authentication procedures. Comparing RF signatures of individuals to existing reference RF signatures may provide increased security in comparison with conventional identification and/or authentication techniques, such as, for example, password controls. Additionally, reference RF signatures may be shared and utilized in a number of different computing devices and systems for identification and/or authentication purposes, enabling a user to access the various computing devices and systems without having to keep track of multiple different passwords.

Any computing device having a transmitting antenna 306 and a sensing antenna array 308 may be configured to identify a user. For example, physical locations, such as buildings, may be equipped with security systems having computing devices, such as security pads, that restrict access to the physical locations. Such a security pad may require identification and authentication of a person prior to granting that person access to the physical location. For example, when an individual attempts to access a building having a security pad, the security pad may conduct an RF scan of the individual. An RF signature of the individual obtained based on the RF scan may be compared with stored reference RF signatures to identify the individual and determine whether the individual is authorized to access the building.

Transactional computing devices, such as an ATM or other banking terminal, may be configured to identify a user of the ATM by obtaining an RF signature of the user. The transactional computing devices may compare the RF signature to reference RF signatures associated with an account that the user is attempting to access to determine whether the user is authorized to access the account. Vehicles may be equipped with a computing device that obtains an RF signature of an individual attempting to use the vehicle. The RF signature of the individual may be compared with reference RF signatures prior to allowing the vehicle to be unlocked, started, driven, and/or otherwise used.

In some implementations, RF signatures may also be utilized to identify perpetrators of criminal activity. For example, an RF scan of a thief may be obtained and used to determine an identity of the thief. An RF scan of, for example, a thief who has stolen a computing device may be obtained by performing an RF scan of a user of the stolen computing device. The RF scan may, for example, be performed when the stolen computing device is detected to be in operation. The RF scan may be used to determine an RF signature of the thief and to compare the RF signature with various reference RF signatures to determine the identity of the thief. Additionally, the RF scan may be used to render a 3-dimensional surface map of, for example, the thief's facial region in order to produce an identification image of the thief. The identification image based on the 3-dimensional surface map may aid in apprehension of the thief by providing a 3-dimensional image of what the thief looks like. Accordingly, authorities or other interested parties may be apprised of what the thief looks like even without the thief's image being captured by an image capture device, such as a camera.

Various computing devices and configurations of transmitting RF antennas and sensing antennas within such computing devices will now be described.

Figure 10:
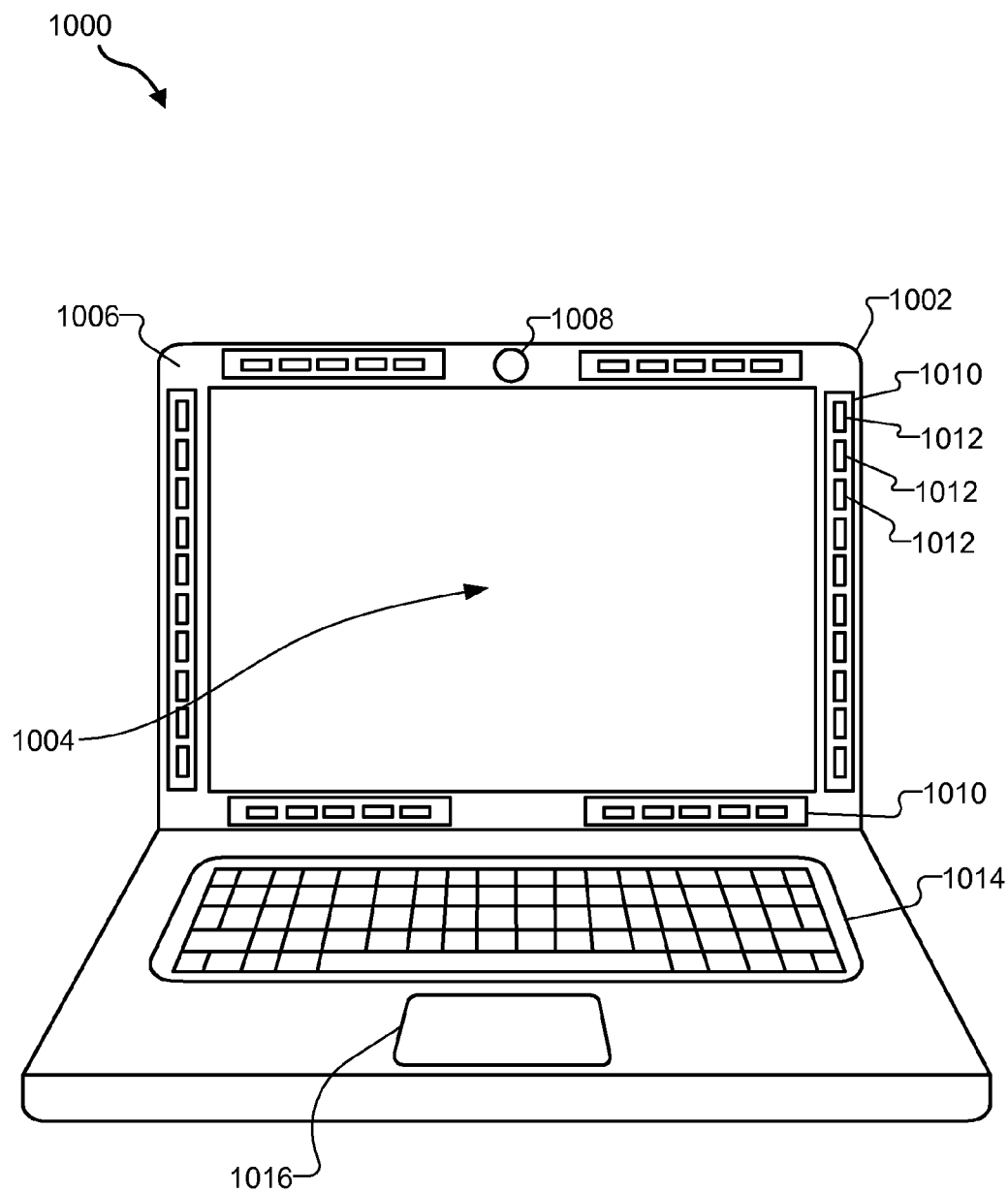
FIGS. 10-14 show exemplary computing devices according to principles described herein.

FIG. 10 illustrates exemplary components of a computing device 1000, which may implement any of the computing devices described herein. Computing device 1000 may include, for example, a laptop computer having a display screen 1002. Display screen 1002 may include an image display region 1004 surrounded by a non-display region 1006, such as a bezel region. Computing device 1000 may additionally include a transmitting antenna 1008 and at least one sensing antenna array 1010 having a plurality of sensing antennas 1012. Additionally, computing device 1000 may include various input devices, such as a keyboard 1014 and a touchpad 1016.

Transmitting antenna 1008 and sensing antenna arrays 1010 may be located in or near display screen 1002 of computing device 1000. For example, as shown, transmitting antenna 1008 and sensing antenna arrays 1010 may be located in non-display region 1006 of display screen 1002. A plurality of sensing antenna arrays 1010 may be positioned in non-display region 1006 so as to not overlap image display region 1004. Sensing antenna arrays 1010 may be substantially symmetrically disposed about a periphery of image display region 1004 such that sensing antennas 1012 of sensing antenna arrays 1010 are not affected by, and/or are not in interference with, image display components within image display region 1006. In some implementations, sensing antennas 1012 may each be arranged in substantially the same plane, such as a plane parallel to a display surface of display screen 1002.

A user may attempt to access at least a portion of data stored within computing device 1000. For example, the user may attempt to log in to an operating system and/or to access a restricted application on computing device 1000. In response, computing device 1000 may display a message in image display region 1004 of display screen 1002 indicating to the user that verification of the user's identity through an RF scan of the user's face must be performed prior to granting the user access to the operating system and/or to the restricted application. Subsequently, computing device 1000 may begin an RF scan of the user by transmitting an RF signal from transmitting antenna 1008 and receiving RF signals reflected from the user at sensing antennas 1012 of sensing antenna arrays 1010. Computing device 1000 may request input from the user via keyboard 1014 and/or touchpad 1016 prior to commencing the RF scan. Computing device 1000 may additionally or alternatively display a time period during which the RF scan is carried out. In some implementations, computing device 1000 may display instructions for positioning the user's face relative to display screen 1002 during the RF scan. For example, computing device 1000 may display a message requesting that the user position his or her face at arms-length relative to display screen 1002 during the RF scan.

Upon completion of the RF scan by computing device 1000, an RF signature obtained from the RF scan may be compared with one or more reference RF signatures stored in computing device 1000 and/or in a storage location external to computing device 1000. If the RF signature for the user is determined by computing device 1000 to match one of the reference RF signatures, then the user may be given access to the operating system of computing device 1000 and/or to one or more applications stored on computing device 1000 in accordance with one or more access privileges associated with the user. Alternatively, if computing device 1000 determines that the RF signature for the user does not match a reference signature, then the user may be prevented from accessing computing device 1000 and/or may be provided with only limited access to computing device 1000.

Figure 11:
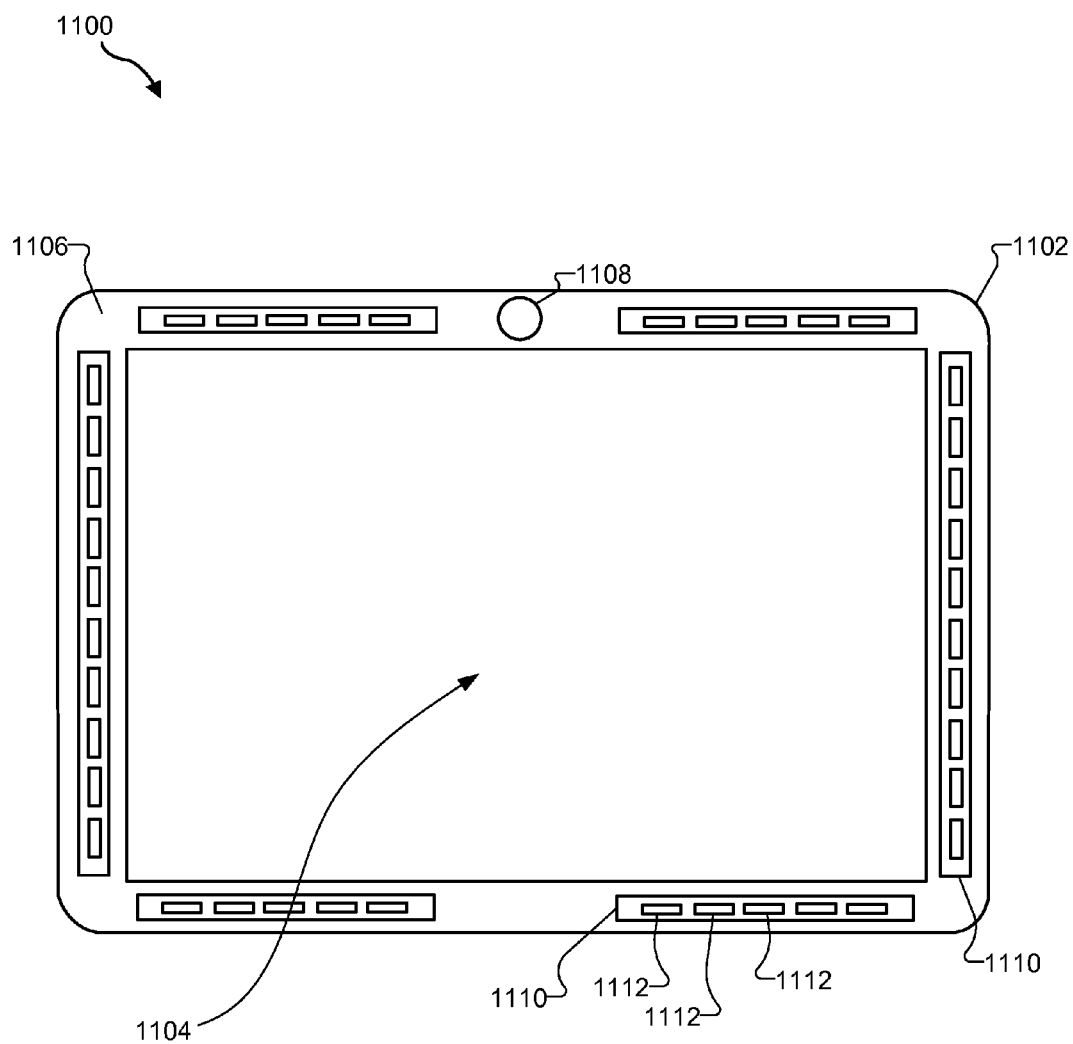

FIG. 11 illustrates exemplary components of another computing device 1100. Computing device 1100 may include, for example, a tablet computer having a display screen 1102 with an image display region 1104 surrounded by a non-display region 1106, such as a bezel region. Computing device 1100 may additionally include a transmitting antenna 1108 and at least one sensing antenna array 1110 having a plurality of sensing antennas 1112. In some implementations, sensing antennas 1112 may each be arranged in substantially the same plane, such as a plane parallel to a display surface of display screen 1102. Various input devices, such as a keyboard, may additionally be attached to computing device 1100 via corresponding input ports and/or a wireless connection (e.g., Bluetooth, Wi-Fi, etc.).

As shown, transmitting antenna 1108 and sensing antenna arrays 1110 may be located in non-display region 1106 of display screen 1102. A plurality of sensing antenna arrays 1110 may be positioned in non-display region 1106 so as to not overlap image display region 1104. Sensing antenna arrays 1110 may be substantially symmetrically disposed about a periphery of image display region 1104 such that sensing antennas 1112 of sensing antenna arrays 1110 are not affected by, and/or are not in interference with, image display components within image display region 1104.

Figure 12:
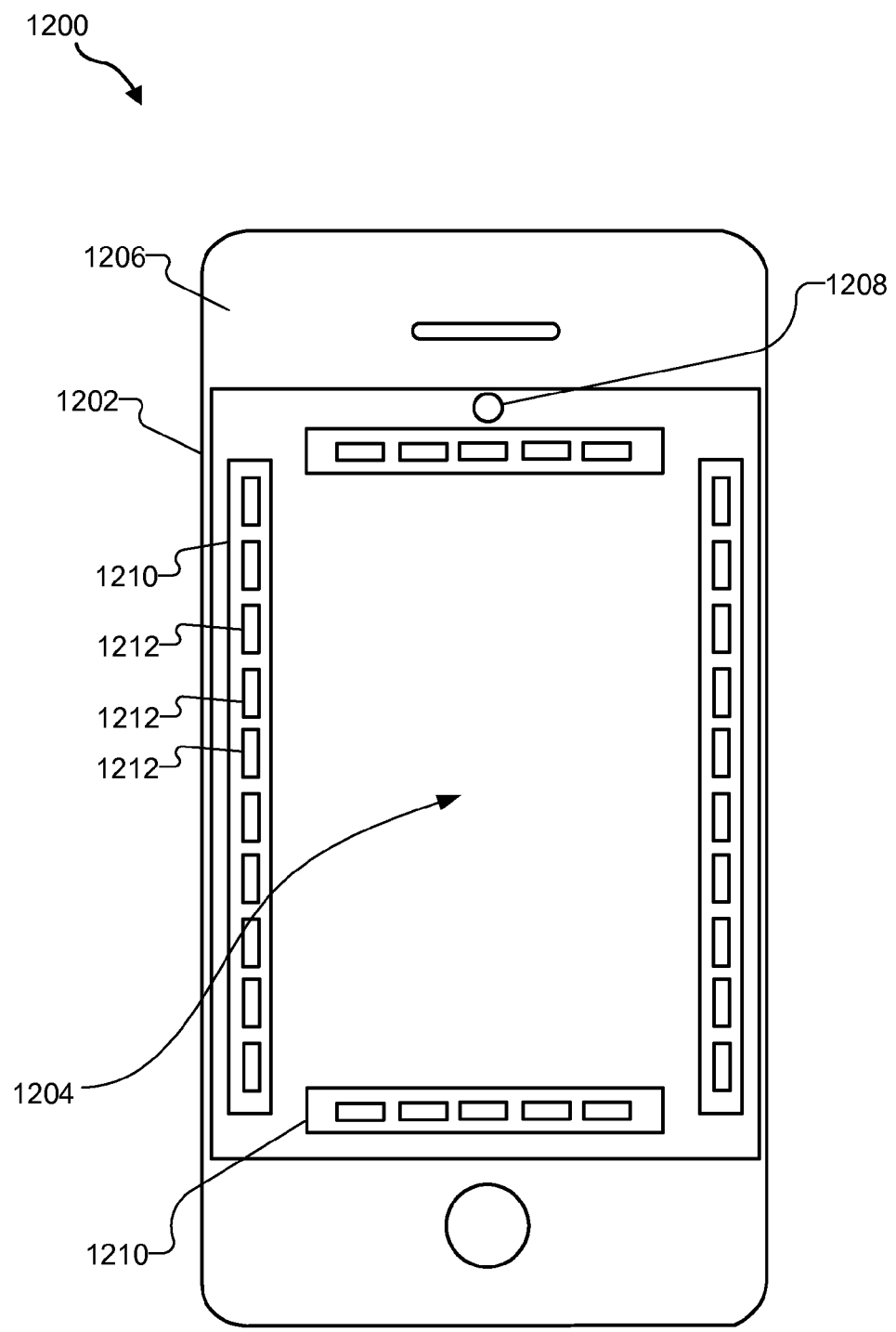

FIG. 12 illustrates exemplary components of another computing device 1200. Computing device 1200 may include, for example, a smartphone device having a display screen 1202 with an image display region 1204 surrounded by a non-display region 1206. Computing device 1200 may additionally include a transmitting antenna 1208 and at least one sensing antenna array 1210 having a plurality of sensing antennas 1212. In some implementations, sensing antennas 1212 may each be arranged in substantially the same plane, such as a plane parallel to a display surface of display screen 1202. Various input devices may additionally be attached to computing device 1200 via corresponding input ports and/or a wireless connection (e.g., Bluetooth, Wi-Fi, etc.).

As shown, transmitting antenna 1208 and sensing antenna arrays 1210 may be located in image display region 1204. For example, sensing antenna array 1210 may be disposed behind a display panel of display screen 1202. Alternatively, one or more of transmitting antenna 1208 and sensing antenna arrays 1210 may be located in non-display region 1206 of display screen 1202. Sensing antenna arrays 1210 may be substantially symmetrically disposed about a periphery of image display region 1204.

Figure 13:
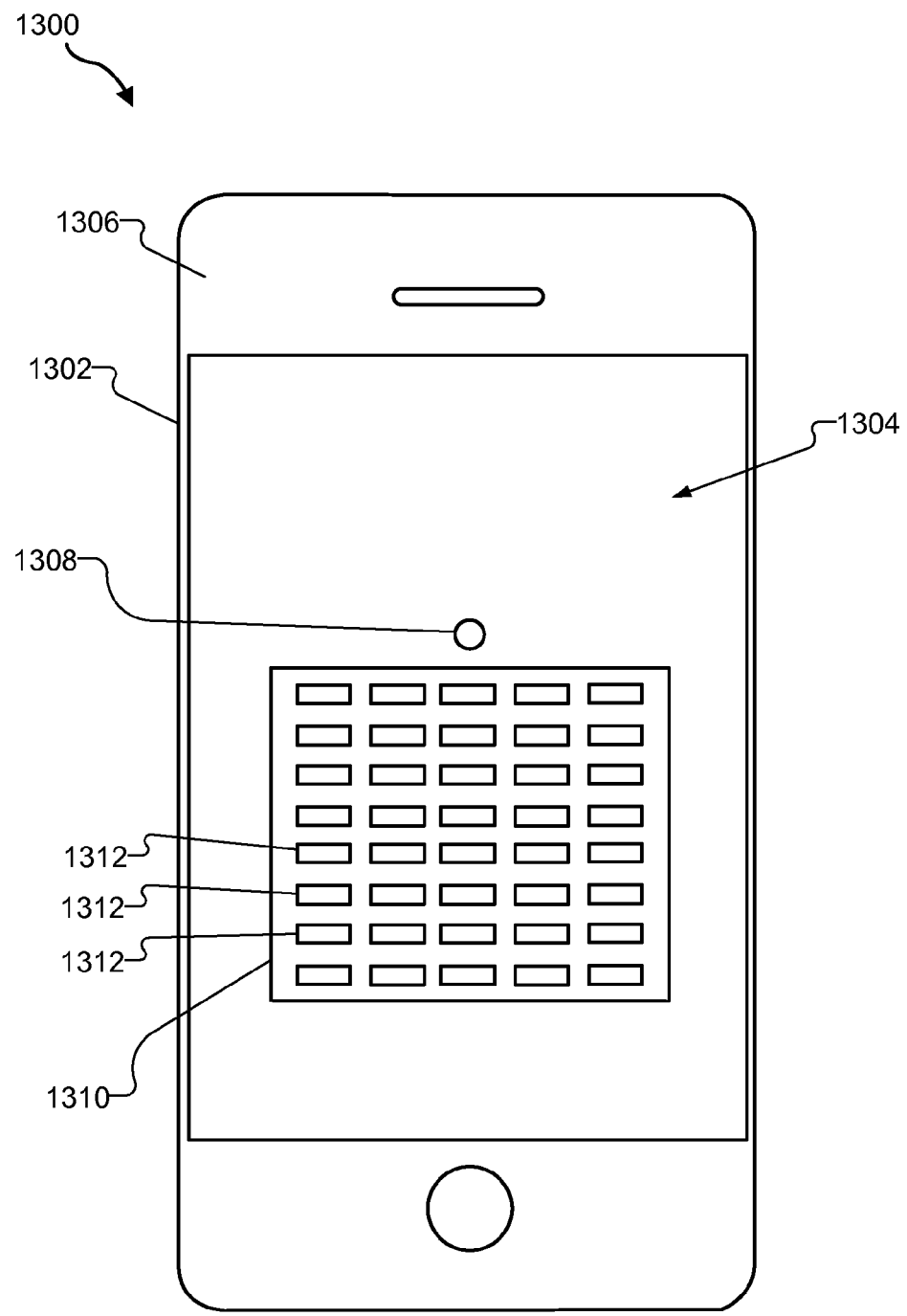

FIG. 13 illustrates exemplary components of another computing device 1300. Computing device 1300 may include, for example, a smartphone device having a display screen 1302 with an image display region 1304 surrounded by a non-display region 1306. Computing device 1300 may additionally include a transmitting antenna 1308 and at least one sensing antenna array 1310 having a plurality of sensing antennas 1312. In some implementations, sensing antennas 1312 may each be arranged in substantially the same plane, such as a plane parallel to a display surface of display screen 1302. Various input devices may additionally be attached to computing device 1300 via corresponding input ports and/or a wireless connection (e.g., Bluetooth, Wi-Fi, etc.).

As shown, transmitting antenna 1308 and sensing antenna array 1310 may be located in image display region 1304 of display screen 1302. For example, sensing antenna array 1310 may be disposed behind a display panel of display screen 1302. In some implementations, sensing antenna array 1310 may be sized to fit behind display panels of each of a plurality of different types of computing devices. Additionally, sensing antenna array 1310 may include an SDR ship integrally formed on a side of sensing antenna array 1310 opposite the front surface of display screen 1302. Because sensing antenna array 1310 is configured to be positioned behind a device display screen, sensing antenna array 1310 may be used in various computing devices without modifying sensing antenna array 1310 to fit behind non-image portions of the devices. Additionally, various computing devices utilizing sensing antenna array 1310 may generate comparable RF signatures due to the size, orientation, and number of sensing antennas in sensing antenna array 1310 being consistent between devices. Another computing device including sensing antenna array 1310 will now be described.

Figure 14:
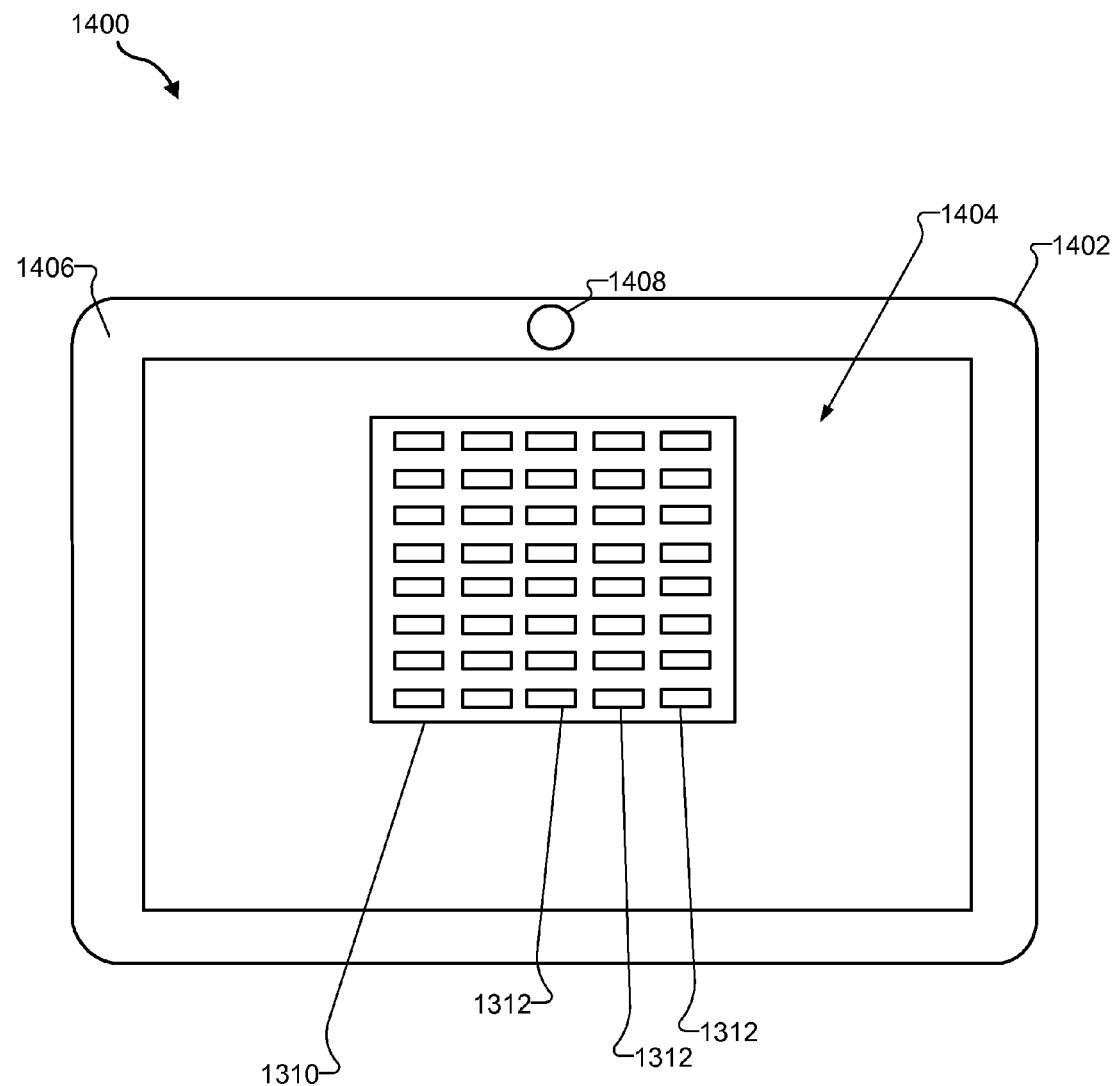

FIG. 14 illustrates exemplary components of a computing device 1400. Computing device 1400 may include, for example, a tablet computer having a display screen 1402 with an image display region 1404 surrounded by a non-display region 1406, such as a bezel region. Computing device 1400 may additionally include a transmitting antenna 1408 and at least one sensing antenna array 1310 having a plurality of sensing antennas 1312. Various input devices, such as a keyboard, may additionally be attached to computing device 1400 via corresponding input ports and/or a wireless connection (e.g., Bluetooth, Wi-Fi, etc.).

As shown, sensing antenna array 1310 may be located in image display region 1404 of display screen 1402. For example, sensing antenna array 1310 may be disposed behind a display panel of display screen 1402. Sensing antenna array 1310 may be sized to fit behind display panels of a plurality of different types of computing devices. Additionally, sensing antenna array 1310 may include an SDR ship integrally formed on a side of sensing antenna array 1310 opposite the front surface of display screen 1402.

Figure 15:
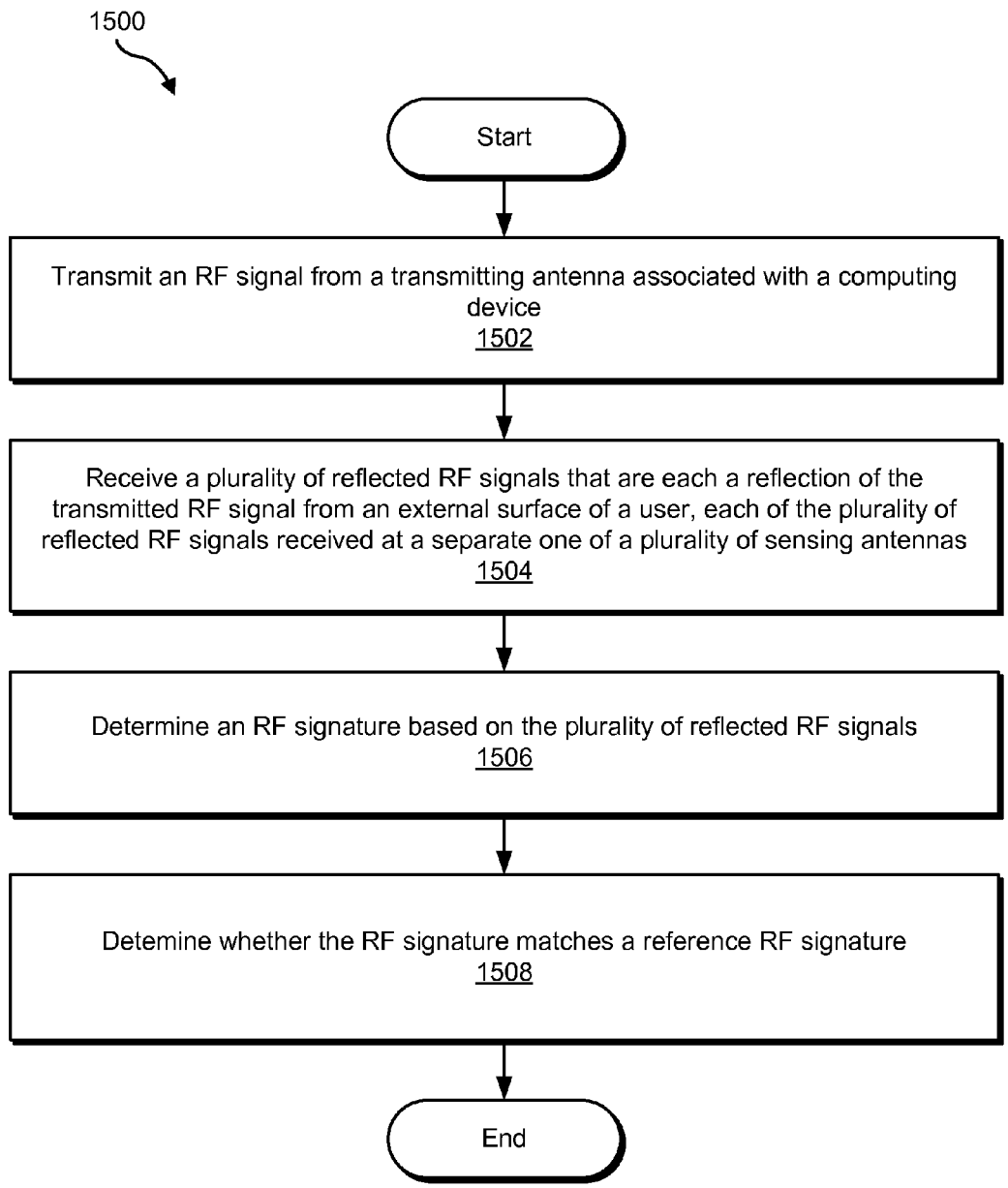
FIG. 15 illustrates an exemplary method of determining a user identity by analysis of reflected radio frequency signals received by an antenna array according to principles described herein.

FIG. 15 illustrates an exemplary method 1500 of determining a user identity by analysis of reflected radio frequency signals received by an antenna array according to principles described herein. While FIG. 15 illustrates exemplary steps according to one embodiment, other embodiments may omit, add to, reorder, and/or modify any of the steps shown in FIG. 15. One or more of the steps shown in FIG. 15 may be performed by system 100 and/or any implementation thereof.

In step 1502, a user identification system transmits an RF signal from a transmitting antenna associated with a computing device. Step 1502 may be performed in any of the ways described herein.

In step 1504, the user identification system receives a plurality of reflected RF signals that are each a reflection of the transmitted RF signal from an external surface of a user, each of the plurality of reflected RF signals received at a separate one of a plurality of sensing antennas. Step 1504 may be performed in any of the ways described herein.

In step 1506, the user identification system determines an RF signature based on the plurality of reflected RF signals. In step 1508, the user identification system determines whether the RF signature matches a reference RF signature. Steps 1506 and 1508 may be performed in any of the ways described herein.

Figure 16:
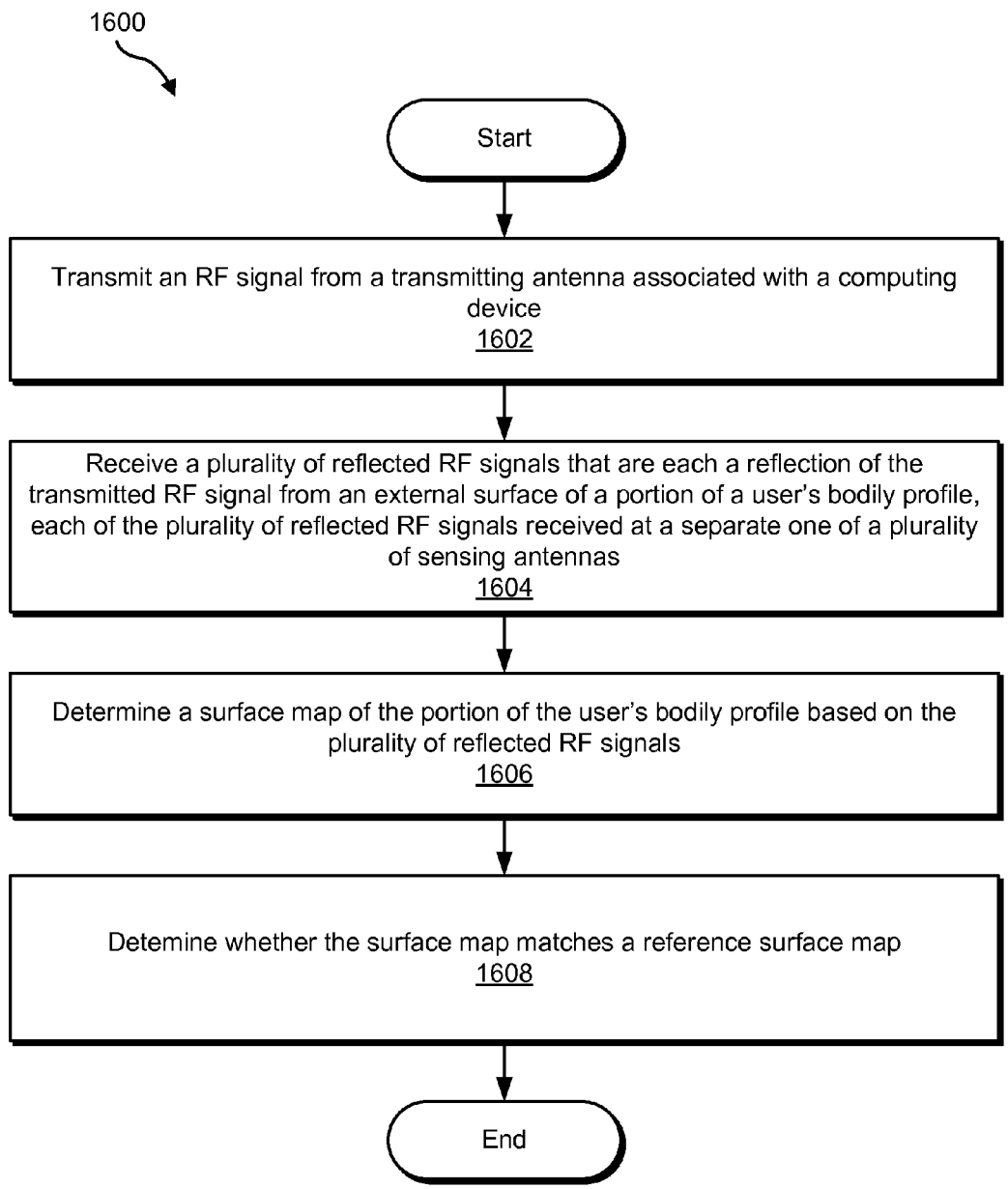
FIG. 16 illustrates another exemplary method of determining a user identity by analysis of reflected radio frequency signals received by an antenna array according to principles described herein.

FIG. 16 illustrates an exemplary method 1600 of determining a user identity by analysis of reflected radio frequency signals received by an antenna array according to principles described herein. While FIG. 16 illustrates exemplary steps according to one embodiment, other embodiments may omit, add to, reorder, and/or modify any of the steps shown in FIG. 16. One or more of the steps shown in FIG. 16 may be performed by system 100 and/or any implementation thereof.

In step 1602, a user identification system transmits an RF signal from a transmitting antenna associated with a computing device. Step 1602 may be performed in any of the ways described herein.

In step 1604, the user identification system receives a plurality of reflected RF signals that are each a reflection of the transmitted RF signal from an external surface of a portion of a user's bodily profile, each of the plurality of reflected RF signals received at a separate one of a plurality of sensing antennas. Step 1604 may be performed in any of the ways described herein.

In step 1606, the user identification system determines a surface map of the portion of the user's bodily profile based on the plurality of reflected RF signals. In step 1608, the user identification system determines whether the surface map matches a reference surface map. Steps 1606 and 1608 may be performed in any of the ways described herein.

In certain embodiments, one or more of the components and/or processes described herein may be implemented and/or performed by one or more appropriately configured computing devices. To this end, one or more of the systems and/or components described above may include or be implemented as one or more computing systems and/or components by any computer hardware, computer-implemented instructions (e.g., software) embodied in a non-transitory computer-readable medium, or combinations of computer-implemented instructions and hardware, configured to execute one or more of the processes described herein. In particular, system components may be implemented on one physical computing device or may be implemented on more than one physical computing device. Accordingly, system components may include any number of physical computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 17:
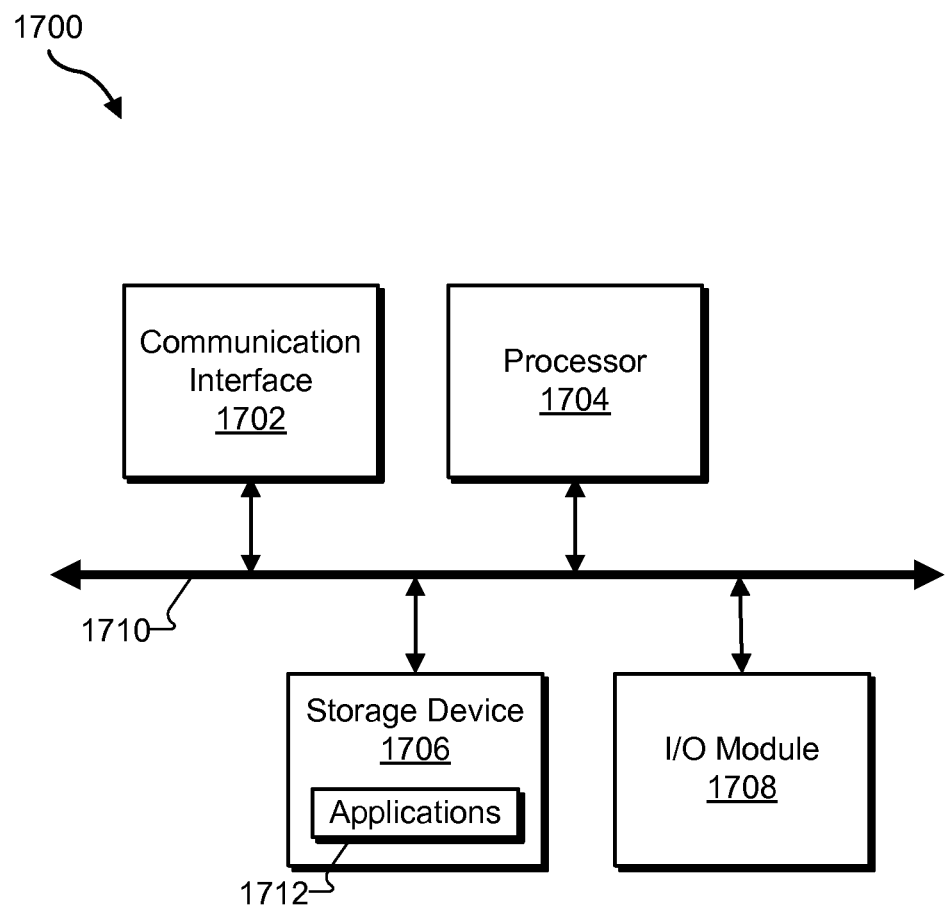
FIG. 17 illustrates an exemplary computing device according to principles described herein.

FIG. 17 illustrates an exemplary computing device 1700 that may be configured to perform one or more of the processes described herein. As shown in FIG. 17, computing device 1700 may include a communication interface 1702, a processor 1704, a storage device 1706, and an input/output ("I/O") module 1708 communicatively connected via a communication infrastructure 1710. While an exemplary computing device 1700 is shown in FIG. 17, the components illustrated in FIG. 17 are not intended to be limiting. Additional or alternative components may be used in other embodiments. Components of computing device 1700 shown in FIG. 17 will now be described in additional detail.

Communication interface 1702 may be configured to communicate with one or more computing devices. Examples of communication interface 1702 include, without limitation, a wired network interface (such as a network interface card), a wireless network interface (such as a wireless network interface card), a modem, an audio/video connection, and any other suitable interface.

Processor 1704 generally represents any type or form of processing unit capable of processing data or interpreting, executing, and/or directing execution of one or more of the instructions, processes, and/or operations described herein. Processor 1704 may direct execution of operations in accordance with one or more applications 1712 or other computer-executable instructions such as may be stored in storage device 1706 or another computer-readable medium.

Storage device 1706 may include one or more data storage media, devices, or configurations and may employ any type, form, and combination of data storage media and/or device. For example, storage device 1706 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1706. For example, data representative of one or more executable applications 1712 configured to direct processor 1704 to perform any of the operations described herein may be stored within storage device 1706. In some examples, data may be arranged in one or more databases residing within storage device 1706.

I/O module 1708 may be configured to receive user input and provide user output and may include any hardware, firmware, software, or combination thereof supportive of input and output capabilities. For example, I/O module 1708 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1708 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1708 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1700. For example, one or more applications 1712 residing within storage device 1706 may be configured to direct processor 1704 to perform one or more processes or functions associated with identity management facility 102. Likewise, storage facility 104 may be implemented by or within storage device 1706.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

transmitting, by at least one physical computing device associated with a computing device, a radio frequency ("RF") signal from a transmitting antenna;

receiving, by the at least one physical computing device, a plurality of reflected RF signals that are each a reflection of the transmitted RF signal from at least a portion of a face of a user, each of the plurality of reflected RF signals received at a separate one of a plurality of sensing antennas;

determining, by the at least one physical computing device, an RF signature unique to the face of the user in comparison with other users having different facial characteristics and different RF signatures, the RF signature based on the plurality of reflected RF signals and obtained by combining the plurality of reflected RF signals to generate the RF signature;

determining, by the at least one physical computing device, whether the RF signature matches a reference RF signature; and granting, by the at least one physical computing device, access to the computing device by the user when the RF signature is determined to match the reference RF signature.

2. The method of claim 1, wherein the plurality of sensing antennas are mounted in the computing device.

3. The method of claim 2, wherein the plurality of sensing antennas are each disposed outside an image display region of the computing device.

4. The method of claim 2, wherein the plurality of sensing antennas are each disposed behind a display panel of a display screen of the computing device.

5. The method of claim 1, wherein the plurality of antennas are arranged in substantially the same plane.

6. The method of claim 1, wherein the determining whether the RF signature matches the reference RF signature comprises determining whether the RF signature matches the reference RF signature to at least a threshold degree of certainty.

7. The method of claim 1, wherein the reference RF signature is associated with a user identifier.

8. The method of claim 1, wherein the reference RF signature is associated with at least one user profile.

9. The method of claim 8, further comprising directing, by the at least one physical computing device, the computing device to operate in accordance with a personal mode of operation associated with the at least one user profile in response to a determination that the RF signature matches the reference RF signature.

10. The method of claim 1, further comprising:
storing, by the at least one physical computing device, the RF signature when the RF signature does not match a reference RF signature; and
associating, by the at least one physical computing device, the RF signature with a new user identifier.

11. The method of claim 1, wherein the reference RF signature is representative of at least a portion of a user's bodily profile that includes the portion of the face of the user.

12. The method of claim 1, wherein the combining the plurality of reflected RF signals to generate the RF signature comprises combining data corresponding to the plurality of reflected RF signals using a summation equation.

13. The method of claim 1, wherein waveforms of at least some of the plurality of reflected RF signals differ from a waveform of the transmitted RF signal in at least one of phase and amplitude.

14. The method of claim 1, embodied as computer-executable instructions on at least one non-transitory computer-readable medium.

15. A method comprising:
transmitting, by at least one physical computing device associated with a computing device, an RF signal from a transmitting antenna;
receiving, by the at least one physical computing device, a plurality of reflected RF signals that are each a reflection of the transmitted RF signal from at least a portion of a face of a user, each of the plurality of reflected RF signals received at a separate one of a plurality of sensing antennas;
determining, by the at least one physical computing device, a surface map of the portion of the face of the user based on the plurality of reflected RF signals and obtained by combining the plurality of reflected RF signals to generate the surface map;
determining, by the at least one physical computing device, whether the surface map matches a reference surface map; and
granting, by the at least one physical computing device, access to the computing device by the user when the surface map is determined to match the reference surface map.

16. The method of claim 15, wherein the surface map comprises a three-dimensional rendering of the portion of the face of the user.

17. The method of claim 15, embodied as computer-executable instructions on at least one non-transitory computer-readable medium.

18. A system comprising:
at least one physical computing device associated with a computing device that:
transmits an RF signal from a transmitting antenna;
receives a plurality of reflected RF signals that are each a reflection of the transmitted RF signal from at least a portion of a face of a user, each of the plurality of reflected RF signals received at a separate one of a plurality of sensing antennas;
determines an RF signature unique to the face of the user in comparison with other users having different facial characteristics and different RF signatures, the RF signature based on the plurality of reflected RF signals and obtained by combining the plurality of reflected RF signals to generate the RF signature;
determines whether the RF signature matches a reference RF signature; and
grants access to the computing device by the user when the at least one physical computing device determines that the RF signature matches the reference RF signature.

19. The system of claim 18, wherein the reference RF signature is associated with at least one user identifier.

* * * * *